(12) United States Patent
Gindin et al.

(10) Patent No.: US 9,529,863 B1
(45) Date of Patent: Dec. 27, 2016

(54) NORMALIZING INGESTED DATA SETS BASED ON FUZZY COMPARISONS TO KNOWN DATA SETS

(71) Applicant: Apptio, Inc., Bellevue, WA (US)

(72) Inventors: Jay Randolf Gindin, Seattle, WA (US); Paul Damien McLachlan, Newcastle, WA (US); Svilen Mihaylov, Seattle, WA (US)

(73) Assignee: Apptio, Inc., Bellevue, WA (US)

( * ) Notice: Subject to any disclaimer, the term of this patent is extended or adjusted under 35 U.S.C. 154(b) by 0 days.

(21) Appl. No.: 14/977,368

(22) Filed: Dec. 21, 2015

(51) Int. Cl.
*G06F 17/30* (2006.01)
(52) U.S. Cl.
CPC ....... *G06F 17/3053* (2013.01); *G06F 17/3048* (2013.01); *G06F 17/30312* (2013.01)
(58) Field of Classification Search
CPC .................................................. G06F 17/30371
See application file for complete search history.

(56) References Cited

U.S. PATENT DOCUMENTS

| | | |
|---|---|---|
| 4,744,026 A | 5/1988 | Vanderbei |
| 5,249,120 A | 9/1993 | Foley |
| 5,615,121 A | 3/1997 | Babayev et al. |
| 5,721,919 A | 2/1998 | Morel et al. |
| 5,758,327 A | 5/1998 | Gardner et al. |
| 5,799,286 A | 8/1998 | Morgan et al. |
| 5,802,508 A | 9/1998 | Morgenstern |
| 5,970,476 A | 10/1999 | Fahey |
| 5,991,741 A | 11/1999 | Speakman et al. |
| 6,014,640 A | 1/2000 | Bent |
| 6,032,123 A | 2/2000 | Jameson |
| 6,047,290 A | 4/2000 | Kennedy et al. |
| 6,208,993 B1 | 3/2001 | Shadmon |
| 6,249,769 B1 | 6/2001 | Ruffin et al. |
| 6,253,192 B1 | 6/2001 | Corlett et al. |
| 6,308,166 B1 | 10/2001 | Breuker et al. |

(Continued)

FOREIGN PATENT DOCUMENTS

JP 2011134268 A 7/2011

OTHER PUBLICATIONS

International Search Report and Written Opinion for PCT/US2015/048697 mailed Mar. 31, 2016, 9 pages.

(Continued)

*Primary Examiner* — Grace Park
(74) *Attorney, Agent, or Firm* — John W. Branch; Lowe Graham Jones PLLC

(57) ABSTRACT

Embodiments are directed towards normalizing ingested data sets based on fuzzy comparisons to known data sets. Raw data sets that each include raw records may be provided to an ingestion engine. Ingestion rules and known data sets may be provided based on the raw records. The ingestion engine may be employed to iteratively execute the ingestion rules. A comparison of the raw records to the known data sets may be performed. Contents of the raw records may be transformed into model record values and stored in model records. A score value that indicates a confidence level that the model records are correct may be provided. An association of the one or more ingestion rules used to transform the raw record contents into the model record values for each of the one or more model records may be added to a data model.

28 Claims, 11 Drawing Sheets

(56) References Cited

U.S. PATENT DOCUMENTS

| | | |
|---|---|---|
| 6,321,207 B1 | 11/2001 | Ye |
| 6,330,552 B1 | 12/2001 | Farrar et al. |
| 6,424,969 B1 | 7/2002 | Gruenwald |
| 6,507,825 B2 | 1/2003 | Suh |
| 6,578,005 B1 | 6/2003 | Lesaint et al. |
| 6,738,736 B1 | 5/2004 | Bond |
| 6,789,252 B1 | 9/2004 | Burke et al. |
| 6,832,212 B1 | 12/2004 | Zenner et al. |
| 6,839,719 B2 | 1/2005 | Wallace |
| 6,877,034 B1 | 4/2005 | Machin et al. |
| 6,882,630 B1 | 4/2005 | Seaman |
| 6,983,321 B2 | 1/2006 | Trinon et al. |
| 7,050,997 B1 | 5/2006 | Wood, Jr. |
| 7,130,822 B1 | 10/2006 | Their et al. |
| 7,149,700 B1 | 12/2006 | Munoz et al. |
| 7,177,850 B2 | 2/2007 | Argenton et al. |
| 7,263,527 B1 | 8/2007 | Malcolm |
| 7,308,427 B1 | 12/2007 | Hood |
| 7,321,869 B1 | 1/2008 | Phibbs, Jr. |
| 7,590,937 B2 | 9/2009 | Jacobus et al. |
| 7,634,431 B2 | 12/2009 | Stratton |
| 7,725,343 B2 | 5/2010 | Johanson et al. |
| 7,742,961 B2 | 6/2010 | Aaron et al. |
| 7,752,077 B2 | 7/2010 | Holden et al. |
| 7,761,548 B2 | 7/2010 | Snyder et al. |
| 7,774,458 B2 | 8/2010 | Trinon et al. |
| 7,783,759 B2 | 8/2010 | Eilam et al. |
| 7,813,948 B2 | 10/2010 | Ratzloff |
| 7,877,742 B2 | 1/2011 | Duale et al. |
| 7,899,235 B1 | 3/2011 | Williams et al. |
| 7,930,396 B2 | 4/2011 | Trinon et al. |
| 7,933,861 B2 | 4/2011 | Zadorozhny |
| 7,945,489 B2 | 5/2011 | Weiss et al. |
| 7,966,235 B1 | 6/2011 | Capelli et al. |
| 7,966,266 B2 | 6/2011 | Delvat |
| 8,010,584 B1 | 8/2011 | Craver et al. |
| 8,024,241 B2 | 9/2011 | Bailey et al. |
| 8,121,959 B2 | 2/2012 | Delvat |
| 8,175,863 B1 | 5/2012 | Ostermeyer et al. |
| 8,195,785 B2 | 6/2012 | Snyder et al. |
| 8,200,518 B2 | 6/2012 | Bailey et al. |
| 8,209,218 B1 | 6/2012 | Basu et al. |
| 8,214,829 B2 | 7/2012 | Neogi et al. |
| 8,260,959 B2 | 9/2012 | Rudkin et al. |
| 8,370,243 B1 | 2/2013 | Cernyar |
| 8,423,428 B2 | 4/2013 | Grendel et al. |
| 8,484,355 B1 | 7/2013 | Lochhead et al. |
| 8,601,263 B1 | 12/2013 | Shankar et al. |
| 8,606,827 B2 | 12/2013 | Williamson |
| 8,766,981 B2 | 7/2014 | McLachlan et al. |
| 8,768,976 B2 | 7/2014 | McLachlan et al. |
| 2002/0002557 A1 | 1/2002 | Straube et al. |
| 2002/0016752 A1 | 2/2002 | Suh |
| 2002/0056004 A1 | 5/2002 | Smith |
| 2002/0069102 A1 | 6/2002 | Vellante et al. |
| 2002/0107914 A1 | 8/2002 | Charisius et al. |
| 2002/0123945 A1 | 9/2002 | Booth et al. |
| 2002/0145040 A1 | 10/2002 | Grabski |
| 2002/0156710 A1 | 10/2002 | Ryder |
| 2002/0174049 A1 | 11/2002 | Kitahara |
| 2002/0178198 A1 | 11/2002 | Steele |
| 2002/0194329 A1 | 12/2002 | Alling |
| 2003/0074269 A1 | 4/2003 | Viswanath |
| 2003/0083888 A1 | 5/2003 | Argenton et al. |
| 2003/0083912 A1 | 5/2003 | Covington et al. |
| 2003/0139960 A1 | 7/2003 | Nishikawa et al. |
| 2003/0139986 A1 | 7/2003 | Roberts, Jr. |
| 2003/0158724 A1 | 8/2003 | Uchida |
| 2003/0158766 A1 | 8/2003 | Mital et al. |
| 2003/0172368 A1 | 9/2003 | Alumbaugh et al. |
| 2003/0195780 A1 | 10/2003 | Arora et al. |
| 2003/0217033 A1 | 11/2003 | Sandler et al. |
| 2003/0236721 A1 | 12/2003 | Plumer et al. |
| 2004/0059611 A1 | 3/2004 | Kananghinis et al. |
| 2004/0093344 A1 | 5/2004 | Berger et al. |
| 2004/0111509 A1 | 6/2004 | Eilam et al. |
| 2004/0186762 A1 | 9/2004 | Beaven et al. |
| 2004/0243438 A1 | 12/2004 | Mintz |
| 2005/0004856 A1 | 1/2005 | Brose et al. |
| 2005/0060298 A1 | 3/2005 | Agapi et al. |
| 2005/0060317 A1 | 3/2005 | Lott et al. |
| 2005/0071285 A1 | 3/2005 | Laicher et al. |
| 2005/0091102 A1 | 4/2005 | Retsina |
| 2005/0120032 A1 | 6/2005 | Liebich et al. |
| 2005/0131870 A1 | 6/2005 | Krishnaswamy et al. |
| 2005/0131929 A1 | 6/2005 | Bailey |
| 2005/0171918 A1 | 8/2005 | Eden et al. |
| 2006/0041458 A1 | 2/2006 | Ringrose et al. |
| 2006/0080264 A1 | 4/2006 | Zhang et al. |
| 2006/0085302 A1 | 4/2006 | Weiss et al. |
| 2006/0085465 A1 | 4/2006 | Nori et al. |
| 2006/0106658 A1 | 5/2006 | Johanson et al. |
| 2006/0126552 A1 | 6/2006 | Lee et al. |
| 2006/0161879 A1 | 7/2006 | Lubrecht et al. |
| 2006/0167703 A1 | 7/2006 | Yakov |
| 2006/0178960 A1 | 8/2006 | Lepman |
| 2006/0179012 A1 | 8/2006 | Jacobs |
| 2006/0190497 A1 | 8/2006 | Inturi et al. |
| 2006/0200400 A1 | 9/2006 | Hunter et al. |
| 2006/0200477 A1 | 9/2006 | Barrenechea |
| 2006/0212334 A1 | 9/2006 | Jackson |
| 2006/0224740 A1 | 10/2006 | Sievers-Tostes |
| 2006/0224946 A1 | 10/2006 | Barrett et al. |
| 2006/0228654 A1 | 10/2006 | Sanjar et al. |
| 2006/0259468 A1* | 11/2006 | Brooks ............ G06F 17/3089 |
| 2006/0282429 A1 | 12/2006 | Hernandez-Sherrington et al. |
| 2007/0088641 A1 | 4/2007 | Aaron et al. |
| 2007/0113289 A1 | 5/2007 | Blumenau |
| 2007/0124162 A1 | 5/2007 | Mekyska |
| 2007/0198982 A1 | 8/2007 | Bolan et al. |
| 2007/0214413 A1 | 9/2007 | Boeckenhauer |
| 2007/0226064 A1 | 9/2007 | Yu et al. |
| 2007/0226090 A1 | 9/2007 | Stratton |
| 2007/0233439 A1 | 10/2007 | Carroll et al. |
| 2007/0260532 A1 | 11/2007 | Blake, III |
| 2007/0265896 A1 | 11/2007 | Smith |
| 2007/0271203 A1 | 11/2007 | Delvat |
| 2007/0276755 A1 | 11/2007 | Rapp |
| 2007/0282626 A1 | 12/2007 | Zhang et al. |
| 2008/0033774 A1 | 2/2008 | Kimbrel et al. |
| 2008/0065435 A1 | 3/2008 | Ratzloff |
| 2008/0071844 A1 | 3/2008 | Gopal et al. |
| 2008/0201269 A1 | 8/2008 | Hollins et al. |
| 2008/0208647 A1 | 8/2008 | Hawley et al. |
| 2008/0295096 A1 | 11/2008 | Beaty et al. |
| 2008/0312979 A1 | 12/2008 | Lee et al. |
| 2009/0012986 A1 | 1/2009 | Arazi et al. |
| 2009/0018880 A1 | 1/2009 | Bailey et al. |
| 2009/0100017 A1 | 4/2009 | Graves et al. |
| 2009/0100406 A1 | 4/2009 | Greenfield et al. |
| 2009/0144120 A1 | 6/2009 | Ramachandran |
| 2009/0150396 A1 | 6/2009 | Elisha et al. |
| 2009/0198535 A1 | 8/2009 | Brown et al. |
| 2009/0210275 A1 | 8/2009 | Andreev et al. |
| 2009/0216580 A1 | 8/2009 | Bailey et al. |
| 2009/0234892 A1 | 9/2009 | Anglin et al. |
| 2009/0300173 A1 | 12/2009 | Bakman et al. |
| 2009/0319316 A1 | 12/2009 | Westerfeld et al. |
| 2010/0005014 A1 | 1/2010 | Castle et al. |
| 2010/0005173 A1 | 1/2010 | Baskaran et al. |
| 2010/0042455 A1 | 2/2010 | Liu et al. |
| 2010/0049494 A1 | 2/2010 | Radibratovic et al. |
| 2010/0082380 A1 | 4/2010 | Merrifield, Jr. et al. |
| 2010/0094740 A1 | 4/2010 | Richter |
| 2010/0125473 A1 | 5/2010 | Tung et al. |
| 2010/0161634 A1* | 6/2010 | Caceres ............ G06F 17/30306 707/758 |
| 2010/0169477 A1 | 7/2010 | Stienhans et al. |
| 2010/0185557 A1 | 7/2010 | Hunter et al. |
| 2010/0211667 A1 | 8/2010 | O'Connell, Jr. |
| 2010/0250419 A1 | 9/2010 | Ariff et al. |
| 2010/0250421 A1 | 9/2010 | Ariff et al. |
| 2010/0250642 A1 | 9/2010 | Yellin et al. |
| 2010/0293163 A1 | 11/2010 | McLachlan et al. |

(56) References Cited

U.S. PATENT DOCUMENTS

| | | |
|---|---|---|
| 2010/0299233 A1 | 11/2010 | Licardi et al. |
| 2010/0306382 A1 | 12/2010 | Cardosa et al. |
| 2010/0325606 A1 | 12/2010 | Sundararajan et al. |
| 2010/0332262 A1 | 12/2010 | Horvitz et al. |
| 2010/0333109 A1 | 12/2010 | Milnor |
| 2011/0016214 A1 | 1/2011 | Jackson |
| 2011/0016448 A1 | 1/2011 | Bauder et al. |
| 2011/0022861 A1 | 1/2011 | Agneeswaran et al. |
| 2011/0066628 A1 | 3/2011 | Jayaraman |
| 2011/0072340 A1 | 3/2011 | Miller |
| 2011/0106691 A1 | 5/2011 | Clark et al. |
| 2011/0167034 A1 | 7/2011 | Knight et al. |
| 2011/0196795 A1 | 8/2011 | Pointer |
| 2011/0225277 A1 | 9/2011 | Freimuth et al. |
| 2012/0023170 A1 | 1/2012 | Matignon et al. |
| 2012/0066020 A1 | 3/2012 | Moon et al. |
| 2012/0131591 A1 | 5/2012 | Moorthi et al. |
| 2012/0150736 A1 | 6/2012 | Dickerson et al. |
| 2012/0185368 A1 | 7/2012 | Schloter et al. |
| 2012/0232947 A1 | 9/2012 | McLachlan et al. |
| 2012/0233217 A1 | 9/2012 | Purpus et al. |
| 2012/0233547 A1 | 9/2012 | McLachlan |
| 2012/0239739 A1 | 9/2012 | Manglik et al. |
| 2012/0330869 A1 | 12/2012 | Durham |
| 2013/0041819 A1 | 2/2013 | Khasho |
| 2013/0060595 A1 | 3/2013 | Bailey |
| 2013/0103369 A1 | 4/2013 | Huynh et al. |
| 2013/0103654 A1 | 4/2013 | McLachlan et al. |
| 2013/0138470 A1 | 5/2013 | Goyal et al. |
| 2013/0179371 A1 | 7/2013 | Jain et al. |
| 2013/0201193 A1 | 8/2013 | McLachlan et al. |
| 2013/0227584 A1 | 8/2013 | Greene et al. |
| 2013/0282537 A1 | 10/2013 | Snider |
| 2013/0290470 A1 | 10/2013 | CaraDonna et al. |
| 2013/0346390 A1 | 12/2013 | Jerzak et al. |
| 2014/0067632 A1 | 3/2014 | Curtis |
| 2014/0075004 A1 | 3/2014 | Van Dusen et al. |
| 2014/0089509 A1 | 3/2014 | Akolkar et al. |
| 2014/0279201 A1 | 9/2014 | Iyoob et al. |
| 2014/0279947 A1* | 9/2014 | Chachra ............ G06F 17/30371 707/691 |
| 2014/0310233 A1* | 10/2014 | Catalano, Sr. .... G06F 17/30563 707/602 |
| 2015/0227991 A1 | 8/2015 | Yu |
| 2015/0363725 A1 | 12/2015 | Anderson et al. |
| 2015/0379061 A1 | 12/2015 | Paraschivescu |
| 2016/0063577 A1 | 3/2016 | Yellin et al. |

OTHER PUBLICATIONS

Office Communication for U.S. Appl. No. 13/365,150, mailed on Apr. 6, 2016, 11 pages.

Office Communication for U.S. Appl. No. 14/722,663, mailed on Mar. 31, 2016, 5 pages.

Van Diessen et al., "Component Business Model for Digital Repositories: A Framework for Analysis," AAAI, 2008, 7 pages.

Melcher et al., "Visualization and Clustering of Business Process Collections Based on Process Metric Values," IEEE Computer Society, 2008, 4 pages.

Lee et al., "Value-Centric, Model-Driven Business Transformation," IEEE, 2008, 8 pages.

Lee et al., "Business Transformation Workbench: A Practitioner's Tool for Business Transformation," IEEE International Conference on Services Computing, 2008, 8 pages.

Risch et al., "Interactive Information Visualization for Exploratory Intelligence Data Analysis," IEEE Proceedings of VRAIS, 1996, 10 pages.

Office Communication for U.S. Appl. No. 13/415,797, mailed on Apr. 4, 2016, 24 pages.

Office Communication for U.S. Appl. No. 13/837,815, mailed on Apr. 13, 2016, 22 pages.

"Activity Based Costing is the best allocation methodology," APPTIO, Community or Technology Business Management, Mar. 16, 2010, 2 pages.

"Amazon Elastic Computer Cloud (Amazon EC2)", archive.org, Oct. 21, 2011, 9 pages http://web.archive.org/web/20111029130914/http://aws.amazon.com/ec2/#pricing.

"Apptio Extends Leadership in Cloud Business Management with Launch of Apptio Cloud Express," Apptio, Dec. 12, 2012, 2 pages http://www.apptio.com/news/apptio-extends-leadership-cloud-business-management-launch-apptio-cloud-express-#. Ukm4r8X7Lco.

"Apptio Optimizes Enterprise IT Costs Utilizing Amazon Web Services Cloud Computing," Apptio, Apr. 7, 2009, 2 pages http://www.apptio.com/news/apptio-optimizes-enterprise-it-costs-utilizing-amazon-web-service-cloud-computing#.Ukm5XsX7Lco.

"Automating Cost Transparency," Apptio, 2008, 15 pages htto://www.cio.com/documents/whitepapers/AutomatedCostTransparency.pdf.

"Cloud Computing and Sustainability: The Environmental Benefits of Moving to the Cloud," Accenture, archive.org, Aug. 31, 2011, 17 pages http://web.archive.org/web/20110813022626/http://www.accenture.com/SiteCollectionDocuments/PDF/Accenture_Sustainability_Cloud_Computing_TheEnvironmentalBenefitsofMovingtotheCloud.pdf.

"IT Cost Transparency and Apptio," Dec. 4, 2008, 2 pages http://web.archive.org/web/20081204012158/http://www.apptio.com/solutions.

"Notice from the European Patent Office dated Oct. 1, 2007 concerning business methods," Official Journal EPO, Nov. 2007. pp. 592-593.

"Program Evaluation and Review Technique," Wikipedia, the free encyclopedia, accessed Mar. 13, 2012, 10 pages http://en.wikipedia.org/wiki/Program_Evaluation_and_Review_Technique—last modified Mar. 12, 2012.

"Project Management," Wikipedia, the free encyclopedia, accessed Mar. 13, 2012, 14 pages http://en.wikipedia.org/wiki/Project_management—last modified Mar. 7, 2012.

"Visualization for Production Management: Treemap and Fisheye Table Browser," Open-Video Organization webpages, 2001, 2 pages http://www.open-video.org/details.php?videoid=4547.

Busch, J., "Six Strategies for IT Cost Allocation" Spend Matters, Jan. 5, 2011, 3 pages http://spendmatters.com/2011/01/05/six-strategies-for-it-cost-allocation/.

Morgan, T. P., "Apptio puffs up freebie cost control freak for public clouds," The Register, Dec. 12, 2012, 2 pages http://www.theregister.co.uk/2012/12/12/apptio cloud express.

Ricknäs, M., "Apptio unveils tool to keep track of cloud costs," ComputerWorld, Dec. 12, 2012, 1 page http://www.computerworld.com/s/article/9234630/Apptio unveils tool to keep track of cloud costs.

Talbot, C., "Apptio Cloud Express Provides Free Usage Tracking Service," talkincloud.com, Dec. 12, 2012, 4 pages http://talkincloud.com/cloud-computing-management/apptio-cloud-express-provides-free-usage-tracking-service.

Vizard, M., "Free Service from Apptio Tracks Cloud Service Provider Pricing," IT Business Edge, Dec. 12, 2012, 6 pages http://www.itbusinessedge.com/blogs/it-unmasked/free-service-from-apptio-tracks-cloud-service-provider-pricing.html.

International Search Report and Written Opinion for International Patent Application No. PCT/US2010/035021 mailed Jul. 14, 2010, 12 pages.

International Report on Patentability for International Patent Application No. PCT/US2010/035021 mailed Nov. 24, 2011, 10 pages.

International Search Report and Written Opinion for International Patent Application No. PCT/US2012/028353 mailed Oct. 31, 2012, 9 pages.

International Search Report and Written Opinion for International Patent Application No. PCT/US2012/028353 mailed Sep. 19, 2013, 6 pages.

International Search Report and Written Opinion for International Patent Application No. PCT/US2012/028378 mailed Sep. 12, 2012, 11 pages.

(56) References Cited

OTHER PUBLICATIONS

International Preliminary Report on Patentability for International Patent Application No. PCT/US2012/028378 mailed Sep. 19, 2013, 7 pages.
Extended European Search Report in EP Application No. 13151967.0-1955, mailed Apr. 19, 2013, 8 pages.
Official Communication for U.S. Appl. No. 12/467,120 mailed Oct. 4, 2011, 12 pages.
Official Communication for U.S. Appl. No. 12/467,120 mailed Jun. 20, 2012, 17 pages.
Official Communication for U.S. Appl. No. 12/467,120 mailed Aug. 29, 2012, 3 pages.
Official Communication for U.S. Appl. No. 12/467,120 mailed Oct. 23, 2013, 21 pages.
Official Communication for U.S. Appl. No. 12/467,120 mailed Mar. 26. 2013, 18 pages.
Official Communication for U.S. Appl. No. 13/324,253 mailed Sep. 25, 2012, 17 pages.
Official Communication for U.S. Appl. No. 13/324,253 mailed Jan. 10, 2013, 20 pages.
Official Communication for U.S. Appl. No. 13/324,253 mailed Mar. 19, 2013, 3 pages.
Official Communication for U.S. Appl. No. 13/324,253 mailed Sep. 6, 2013, 21 pages.
Official Communication for U.S. Appl. No. 13/415,797 mailed Oct. 3, 2013, 17 pages.
Official Communication for U.S. Appl. No. 13/452,628 mailed Apr. 22, 2013, 11 pages.
Official Communication for U.S. Appl. No. 13/675,837 mailed Oct. 10, 2013, 41 pages.
Official Communication for U.S. Appl. No. 13/837,815 mailed Oct. 23, 2013, 9 pages.
Official Communication for U.S. Appl. No. 13/917,478 mailed Nov. 7, 2013, 15 pages.
Official Communication for U.S. Appl. No. 13/917,503 mailed Oct. 10, 2013, 41 pages.
Official Communication for U.S. Appl. No. 13/935,147 mailed Oct. 22, 2013, 16 pages.
Official Communication for U.S. Appl. No. 13/649,019, mailed Sep. 23, 2015, 15 pages.
Official Communication for U.S. Appl. No. 13/365,150 mailed Sep. 24, 2015, 15 pages.
Official Communication for U.S. Appl. No. 14/033,130 mailed Sep. 15, 2015, 22 pages.
Official Communication for U.S. Appl. No. 13/452,628 mailed Jan. 12, 2016, 21 pages.
Official Communication for U.S. Appl. No. 13/649,019 mailed Jan. 4, 2016, 8 pages.
European Examination Report for Application No. 14159413.5 mailed Jul. 15, 2015, 9 pages.
Official Communication for U.S. Appl. No. 13/415,701 mailed on Oct. 27, 2015, 16 pages.
Official Communication for U.S. Appl. No. 14/869,721 mailed Jan. 13, 2016, 57 pages.
Official Communication for U.S. Appl. No. 13/675,837 mailed on Oct. 26, 2015, 20 pages.
Official Communication for U.S. Appl. No. 13/917,503 mailed on Oct. 22, 2015, 19 pages.
Official Communication for U.S. Appl. No. 14/722,663 mailed on, Dec. 1, 2015, 37 pages.
Official Communication for U.S. Appl. No. 13/452,628 mailed Nov. 18, 2013, 15 pages.
Official Communication for U.S. Appl. No. 14/033,130 mailed Dec. 16, 2013, 15 pages.
Official Communication for U.S. Appl. No. 13/324,253 mailed Jan. 23, 2014, 15 pages.
Official Communication for U.S. Appl. No. 13/675,837 mailed Jan. 31, 2014, 37 pages.
Official Communication for U.S. Appl. No. 13/917,503 mailed Jan. 31, 2014, 25 pages.
Robinson Glen, Cloud Economics—Cost Optimization (selected slides), Amazon Web Services AWS, Slideshare, Feb. 28, 2012 http://www.slideshare.net/AmazonWebServices/whats-new-with-aws-london.
Skilton et al, Building Return on Investment from Cloud Computing, The open Group Whitepaper, mladina webpages, Apr. 2010 http://www.mladina.si/media/objave/dokumenti/2010/5/31/31_5_2010_open_group_building_return-on-investment-from-cloud-computing.pdf.
Ward Miles, Optimizing for Cost in the Cloud (selection), AWS Summit, Slideshare Apr. 2012 http://www.slideshare.net/AmazonWebServices/optimizing-your-infrastructure-costs-on-aws.
Amazon Reserved Instances Amazon Web Services, archives org, Jan. 14, 2013 http://web.archive.org/web/2012011453849/http://aws.amazon.com/rds/reserved-instances/?.
Cost Optimisation with Amazon Web Services, extracted slides, Slideshare Jan. 30, 2012 http://www.slideshare.net/AmazonWebServices/cost-optimisation-with-amazon-web-services?from_search=1.
Deciding an Approach to the cloud AWS Reserved Instances, Cloudyn webpages; Feb. 28, 2012 https://www.cloudyn.com/blog/deciding-an-approach-to-the-cloud-aws-reserved-aws.
Ganesan Harish, Auto Scaling using AWS, Amazon Web Services AWS (selected slides), Apr. 20, 2011 http://www.slideshare.net/harishganesan/auto-scaling-using-amazon-web-services-aws.
Office Communication for U.S. Appl. No. 13/415,797 mailed on Apr. 9, 2014, 18 pages.
Office Communication for U.S. Appl. No. 13/324,253 mailed on Apr. 9, 2014, 3 pages.
Office Communication for U.S. Appl. No. 13/324,253 mailed on Oct. 24, 2014, 26 pages.
Office Communication for U.S. Appl. No. 13/365,150 mailed on Dec. 3, 2014, 16 pages.
Office Communication for U.S. Appl. No. 13/452,628 mailed on Oct. 1, 2014, 14 pages.
Office Communication for U.S. Appl. No. 13/837,815 mailed on Apr. 7, 2014, 14 pages.
Office Communication for U.S. Appl. No. 13/365,150 mailed on Dec. 7, 2015, 3 pages.
Office Communication for U.S. Appl. No. 13/675,837 mailed on Apr. 2, 2014, 3 pages.
Office Communication for U.S. Appl. No. 13/917,503 mailed on Apr. 3, 2014, 3 pages.
Office Communication for U.S. Appl. No. 13/935,147 mailed on Apr. 11, 2014, 22 pages.
Office Communication for U.S. Appl. No. 13/935,147 mailed on Jun. 16, 2014, 3 pages.
Office Communication for U.S. Appl. No. 14/033,130 mailed on May 27, 2014, 22 pages.
Office Communication for U.S. Appl. No. 14/033,130 mailed on Aug. 5, 2014, 3 pages.
Office Communication for U.S. Appl. No. 14/180,308 mailed on Jan. 30, 2015, 21 pages.
Office Communication for U.S. Appl. No. 14/180,308 mailed on Apr. 8, 2014, 16 pages.
Office Communication for U.S. Appl. No. 13/452,628 mailed on Mar. 13, 2014, 15 pages.
SAS Activity-Based Management, 2010, Fact Sheet, 4 pages.
Office Communication for U.S. Appl. No. 14/180,308 mailed on Sep. 2, 2014, 19 pages.
Office Communication for U.S. Appl. No. 14/180,308 mailed on Apr. 17, 2015, 5 pages.
Extended European Search Report in EP Application No. 14159413.5 mailed Jul. 4, 2014, 11 pages.
Office Communication for U.S. Appl. No. 13/415,797 mailed on mailed Jan. 12, 2015, 20 pages.
Office Communication for U.S. Appl. No. 13/837,815 mailed Sep. 25, 2014, 16 pages.
Office Communication for U.S. Appl. No. 13/324,253 mailed on Feb. 19, 2015, 22 pages.
Henriet et al. "Traffic-Based Cost Allocation in a Network." The Rand Journal of Economics, 1996, pp. 332-345.

(56) References Cited

OTHER PUBLICATIONS

Rudnick et al., "Marginal Pricing and Supplement Cost Allocation in Transmission Open Access." Power Systems, IEEE Transactions on 10.2, 1995, pp. 1125-1132.
Office Communication for U.S. Appl. No. 13/949,019 mailed on Feb. 10, 2015, 14 pages.
European Search Report for Application No. 12755613.2 mailed on Jan. 26, 2015, 6 pages.
Office Communication for U.S. Appl. No. 13/452,628 mailed on Mar. 30, 2015, 18 pages.
Office Communication for U.S. Appl. No. 13/917,503 mailed on Apr. 16, 2015, 19 pages.
Office Communication for U.S. Appl. No. 13/675,837 mailed on Apr. 16, 2015, 19 pages.
Office Communication for U.S. Appl. No. 13/837,815 mailed on Apr. 27, 2015, 18 pages.
Office Communication for U.S. Appl. No. 13/452,628 mailed on Jun. 23, 2015, 3 pages.
Office Communication for U.S. Appl. No. 13/415,797 mailed Jul. 23, 2015, 22 pages.
International Search Report and Written Opinion for PCT/US2015/015486 mailed Jun. 29, 2015, 13 pages.
Office Communication for U.S. Appl. No. 13/935,147 mailed Jul. 9, 2015, 6 pages.
Office Communication for U.S. Appl. No. 13/415,797 mailed on Oct. 19, 2015, 3 pages.
Office Communication for U.S. Appl. No. 13/837,815 mailed on Sep. 28, 2015, 20 pages.
Chien-Liang Fok et al., "Rapid Development and Flexible Deployment of Adaptive Wireless Sensor Network Applications," Proceedings of the 25th IEEE International Conference on Distributed Computing Systems, 2005, pp. 653-662 (10 pages).
Frans Flippo et al., "A Framework for Rapid Development of Multimodal Interfaces," Proceedings of the 5th International Conference on Multimodal Interfaces, 2003, pp. 109-116 (8 pages).
David B. Stewart et al., "Rapid Development of Robotic Applications Using Component-Based Real-Time Software," Intelligent Robots and Systems 1995, Human Robot Interaction and Cooperative Robots Proceedings, 1995, IEEE International Conference on vol. 1, pp. 465-470 (6 pages).
Office Communication for U.S. Appl. No. 14/846,349 mailed on Dec. 17, 2015, 23 pages.
Office Communication for U.S. Appl. No. 13/935,147 mailed on Mar. 9, 2016, 10 pages.
Office Communication for U.S. Appl. No. 14/033,130 mailed Feb. 18, 2016, 22 pages.
Office Communication for U.S. Appl. No. 14/867,552, mailed on Apr. 25, 2016, 12 pages.
Office Communication for U.S. Appl. No. 14/033,130, mailed on Apr. 25, 2016, 4 pages.
Office Communication for U.S. Appl. No. 14/971,944, mailed on May 19, 2016, 17 pages.
Stephen Muller and Hasso Platner, "An IN-Depth Analysis of Data Aggregation Cost Factors in a Columnar In-Memory Database", ACM DOLAP'12, Nov. 2, 2012, Maui, Hawaii, USA, pp. 65-72.
Office Communication for U.S. Appl. No. 14/869,721 mailed on Jun. 1, 2016, 35 pages.
Office Communication for U.S. Appl. No. 13/837,815 mailed on Jun. 23, 2016, 3 pages.
Office Communication for U.S. Appl. No. 14/846,349 mailed on Jul. 1, 2016, 24 pages.
Office Communication for U.S. Appl. No. 14/981,747 mailed on Jul. 14, 2016, 29 pages.
Office Communication for U.S. Appl. No. 14/869,721 mailed on Aug. 3, 2016, 5 pages.
Office Communication for U.S. Appl. No. 13/452,628 mailed on Aug. 18, 2016, 22 pages.

* cited by examiner

US 9,529,863 B1

NORMALIZING INGESTED DATA SETS BASED ON FUZZY COMPARISONS TO KNOWN DATA SETS

TECHNICAL FIELD

The present invention relates generally to computer automated data ingestion for budget modeling, forecasting and cost accounting, and more particularly, but not exclusively to improving the quality of the ingested data.

BACKGROUND

Businesses that strive to remain viable and successful in today's competitive commercial environment are required to adopt accurate and responsive budgeting practices. To improve efficiency, businesses use financial models that apply modern budgeting, forecasting and cost accounting techniques. For some accounting techniques, the complexity of the financial models may increase as the number of tracked activities and elements increases. Therefore, for larger enterprises, sophisticated computer programs and computers are often required to assist in generating useful and relevant budgets based on financial models. In some cases, the large number of items and entities required for financial modeling can make development of modeling applications difficult. Historically, the size and complexity of these financial allocation models have made it difficult to accurately ascertain a total cost of ownership for an offering such as a product and/or service. Further, the size and complexity of modern financial allocation models can make it difficult to generate reporting information based on the model. In some case the sheer number of items that may need to be modeled may encourage organizations to employ automated data entry processes to populate their financial models. Accordingly, the integrity of the data model may depend on the integrity of the imported data and/or the automated data entry processes. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Description of the Various Embodiments, which is to be read in association with the accompanying drawings, wherein.

DESCRIPTION OF THE VARIOUS EMBODIMENTS

Figure 1:
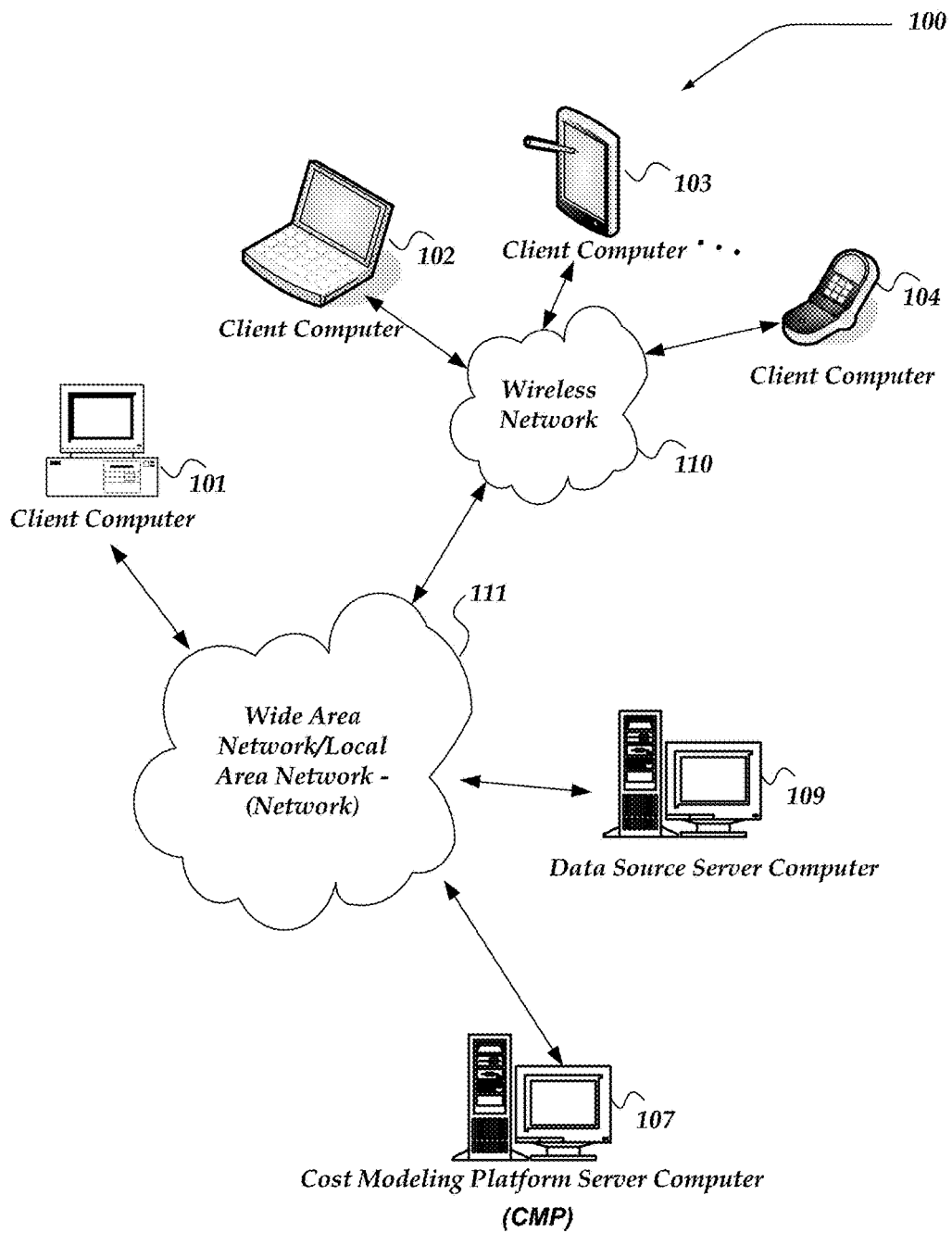
FIG. 1 illustrates a system diagram showing components of an environment in which at least one of the various embodiments may be practiced.

The present innovations now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "Financial allocation model," "data model", and "cost model" refers to a graph based representation of a system of financial allocation rules that can be used for costing actual expenditures (for management accounting) or budgeting future expenditures. Nodes in the model may represent classes of items that may be associated with costs and/or expenses. The edges of the graph may represent how the costs and/or expenses may be allocated between the nodes. A financial allocation model may be a visual rendering of a graph showing the nodes and the edges connecting the nodes.

As used herein, the term "model line item," refers to a single line item in a data model and its associated characteristics, including resources, costs, expenses, or the like. For example, the costs associated with a particular computer that is an email server may be represent by a single model line item having a particular cost (e.g., the email server may correspond to a model line item).

As used herein, the term "category," or "model object" refers to a set and/or class of model line items that may be grouped together. Also, dataset information may be mapped to one or more categories by an ingestion engine. For example, a collection of computers performing services such as email, web serving, enterprise resource planning, may represent separate model line items and they may be grouped into the Servers category and/or Servers Object.

As used herein, the terms "allocation rules," "entity propagation rules," or "propagation rules" refer to rules in the financial data model that determine how the costs/expenses from a category are apportioned between/among other categories. Also, such rules may be assigned to individual cost line items. For example, if an email server cost line item has a value of $1000 an allocation or entity propagation rule may be defined such that 50% of the expense may be allocated to the Marketing department and 50% may be allocated to the Engineering department. Also, allocation rules may be applied at the category/object as well as the model line item level.

As used herein, the term "assignment ratios," refers to an allocation rule, or the results of applying one or more rules, of the distribution ratio of costs to cost line items or categories. For example, if $1000 may be allocated to Servers category, and the cost line item Email Server is allocated $800 and the cost line item FTP Server is allocation $200, the assignment ratios may be determined to 80% to budget item line Email Server and 20% to cost line item FTP Server. Assignment ratios may be explicitly defined by allocation rules. Or they may be derived from the allocation tables by converting the values into ratios of the total allocation to the category.

As used herein, the term "external data source" refers to any separately located system that may enable and/or provide access to one or more datasets of information.

As used herein, the term "dataset" refers to a collection of data, usually presented in tabular form. Each column may represent a particular variable. Each row may represent a given member of the dataset. Also, it may list values for fields for each of the variables, such as name, location, cost, owner, manufacturer, serial number, or the like. Non-tabular datasets can also take the form of marked up strings of characters, such as an XML file.

As used herein, the term "source object" refers to an model object in a data model that may be providing resource values (e.g., costs/expenses) that may be allocated to one or more other model objects (target objects). In at least one of the various embodiments, source objects may be used to represent one or more categories in a data model.

As used herein, the term "target object" refers to an object in a data model that may be allocated values (e.g., costs/expenses) from one or more other objects (source objects). In at least one of the various embodiments, target objects may be used to represent one or more categories in a data model.

As used herein, the terms "raw data," "raw data sets" refer to data sets produced by an organization that may represent the items to be included in the model. In some embodiments raw data may be provided in various formats. In simple cases, raw data may be provided in spreadsheets, databases, csv files, or the like. In other cases, raw data may be structured XML files, models information from one or more cost modeling systems, or the like.

As used herein, the term "model object" refers to items that comprises a given data model. The model objects comprising data models may also be considered categories in financial allocation models, cost models, or the like. Also, in some embodiments, model objects may be considered towers or sub-towers of cost models. One or more model elements in a raw customer model may be mapped to one or more elements of a customer model based on a standard model.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards normalizing ingested data sets based on fuzzy comparisons to known data sets. In at least one of the various embodiments, one or more raw data sets that each include one or more raw records may be provided to an ingestion engine. In at least one of the various embodiments, providing the one or more raw data sets to an ingestion engine may include caching at least a portion of the one or more raw data sets when network communication is disabled; and providing the cached at least portion of the one or more raw data sets when network communication is enabled.

In at least one of the various embodiments, one or more ingestion rules and one or more known data sets may be provided based on a type of the one or more raw records. In at least one of the various embodiments, the one or more known data sets may be provided from one or more external sources.

In at least one of the various embodiments, the ingestion engine may be employed to iteratively execute the one or more ingestion rules to at least perform the below described actions: In at least one of the various embodiments, a comparison of one or more portions of the one or more raw records to the one or more known data sets may be provided. In at least one of the various embodiments, the comparison of the one or more portions of the one or more raw records to the one or more known data sets may include communicating the one or more portions of the one or more raw records to an external service to perform the comparison.

In at least one of the various embodiments, contents of the one or more raw records may be transformed into one or more model record values based on the comparison to the one or more known data sets; in at least one of the various embodiments, the one or more model record values may be stored in one or more model records; in at least one of the various embodiments, a score value that indicates a confidence level that the one or more model records are correct may be provided; and, in at least one of the various embodiments, storing an association of the one or more ingestion rules used to transform the raw record contents into the model record values for each of the one or more model records.

In at least one of the various embodiments, the score value that indicates the confidence level of the one or more model records is less than a threshold value, a user-interface that enables interactive modification of the one or more model records may be provided. In at least one of the various embodiments, providing the user-interface that enables interactive modification of the one or more model records may include storing a historical record of the modifications made to the one or more model records; and generating a report that includes a source and a type of one or more errors that triggered the interactive modification session. In at least one of the various embodiments, the one or more model records may be stored in a data store and are added to the data model.

In at least one of the various embodiments, the ingestion engine may be arranged to provide one or more model record values may be suggested for the one or more model records based on the one or more raw records and the one or more known data sets.

In at least one of the various embodiments, if two or more of the one or more ingestion rules matches a raw record, at least one model record may be provided for each of the matched two or more ingestion rules. And, in at least one of the various embodiments, one or more resource values corresponding to the raw record to the at least one model records may be allocated based on weighting values that are associated with the two or more ingestion rules.

Illustrated Operating Environment

FIG. 1 shows components of one embodiment of an environment in which at least one of the various embodiments may be practiced. Not all of the components may be required to practice various embodiments, and variations in the arrangement and type of the components may be made. As shown, system 100 of FIG. 1 includes local area networks ("LANs")/wide area networks ("WANs")—(network) 111, wireless network 110, client computer 101-104, and Cost Modeling Platform Server (CMP) 107.

Generally, client computers 102-104 may include virtually any portable computing device capable of receiving and sending a message over a network, such as network 111, wireless network 110, or the like. Client computers 102-104 may also be described generally as client computers that are configured to be portable. Thus, client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client computers 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client computer 101 may include virtually any computing device capable of communicating over a network to send and receive information, including messaging, performing various online actions, or the like. The set of such devices may include devices that typically connect using a wired or wireless communications medium such as personal computers, tablet computers, multiprocessor systems, microprocessor-based or programmable consumer electronics, network Personal Computers (PCs), or the like. In at least one of the various embodiments, at least some of client computers 102-104 may operate over wired and/or wireless network.

Today, many of these devices include a capability to access and/or otherwise communicate over a network such as network 111 and/or wireless network 110. Moreover, client computers 102-104 may access various computing applications, including a browser, or other web-based application.

In at least one of the various embodiments, one or more of client computers 101-104 may be configured to operate within a business or other entity to perform a variety of services for the business or other entity. For example, client computers 101-104 may be configured to operate as a web server, an accounting server, a production server, an email server, video game server, an inventory server, or the like. However, client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In at least one of the various embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In at least one of the various embodiments, a user of the client computer may employ the browser application to perform various actions over a network.

Client computers 101-104 also may include at least one other client application that is configured to receive and/or send data, including budgeting and forecasting information, between another computing device. Client applications may include a capability to provide requests and/or receive data relating to the cost models, budget reports, budget project information, allocation rules, or the like. The client application may provide data representing assignment and/or allocation changes, selecting templates, editing cost allocations between or among categories, generating and/or modifying recursive allocation rules, or the like. In at least one of the various embodiments, client applications may receive and/or generate data related to budgeting and financial models and may generate tables and relationships between and among the data. In at least one of the various embodiments, client computers 101-104 may view and/or modify generated data models.

Wireless network 110 is configured to couple client computers 102-104 and its components with network 111. Wireless network 110 may include any of a variety of wireless sub-networks that may further overlay stand-alone ad-hoc networks, or the like, to provide an infrastructure-oriented connection for client computers 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, 5G, and future access networks may enable wide area coverage for mobile devices, such as client computers 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), High Speed Downlink Packet Access (HSDPA), Long Term Evolution (LTE), or the like. In essence, wireless network 110 may include virtually any wireless communication mechanism by which information may travel between client computers 102-104 and another computing device, network, or the like.

Network 111 is configured to couple network computers with other computing devices, including, CMP 107, client computer(s) 101, and through wireless network 110 to client computers 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, processor-readable storage devices described in more detail below.

Figure 3:
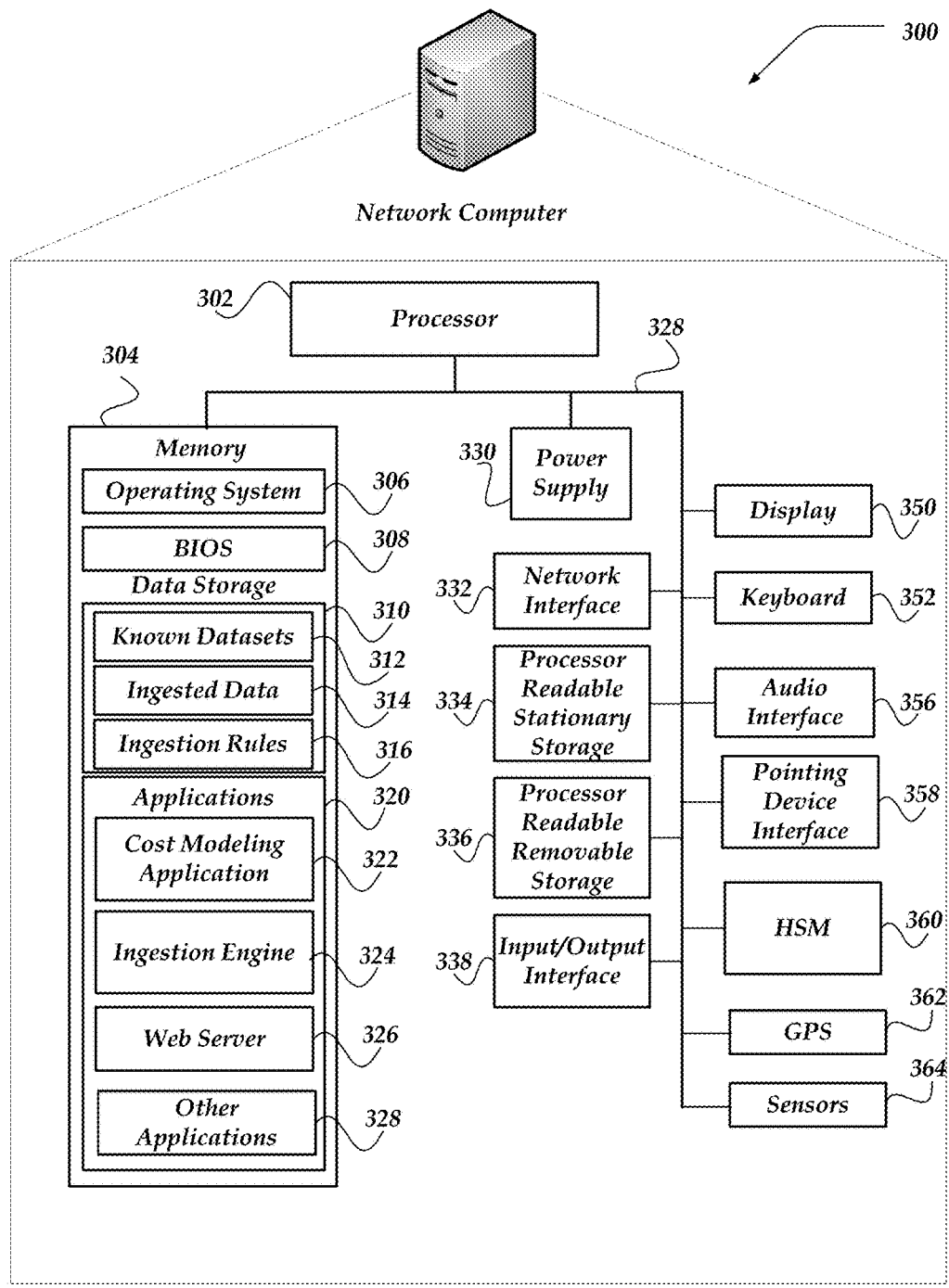
FIG. 3 illustrates one embodiment of a network computer that may be included in a system.

CMP 107 may include virtually any network computer usable to perform data processing operation that may be used for generating cost models, data models, allocation rules, recursive allocation rules, cost allocations, total cost values for offerings, displays and/or reports thereof, such as network computer 300 of FIG. 3. In at least one of the various embodiments, CMP 107 employs various techniques to create, define, generate, and/or automated data processing applications such as budgeting and financial management applications and one or more cost models and/or data models. CMP 107 may include modules for generating data processing applications that may apply models that may include dataset templates, category templates, allocation rules, recursive allocation rules or the like. Furthermore, CMP 107 may include and/or generate data processing applications for visualizing the generated allocation categories, cost allocations, budgets, cost models, data models, allocation rules, recursive allocation rules, total cost values for offerings, or the like.

Devices that may operate as CMP 107 include various network computers, including, but not limited to personal computers, desktop computers, multiprocessor systems, microprocessor-based or programmable consumer electronics, network PCs, server devices, tablet computers, network appliances, or the like. It should be noted that while CMP 107 is illustrated as a single network computer, the invention is not so limited. Thus, in another embodiment, CMP 107 may represent a plurality of network computers. For example, in at least one of the various embodiments, CMP 107 may be distributed over a plurality of network computers and/or implemented using cloud architecture.

Moreover, CMP 107 is not limited to a particular configuration. Rather, CMP 107 may operate using a controller/worker approach over a plurality of network computers, within a cluster, a peer-to-peer architecture, cloud-based architecture (e.g., virtual machines), and/or any of a variety of other architectures. Thus, CMP Server Computer 107 is not to be construed as being limited to a single environment, and other configurations, and architectures are also envisaged. CMP Server Computer 107 may employ processes and such as described below in conjunction with FIG. 4 and above to perform at least some of its actions.

Illustrative Client Computer

Figure 2:
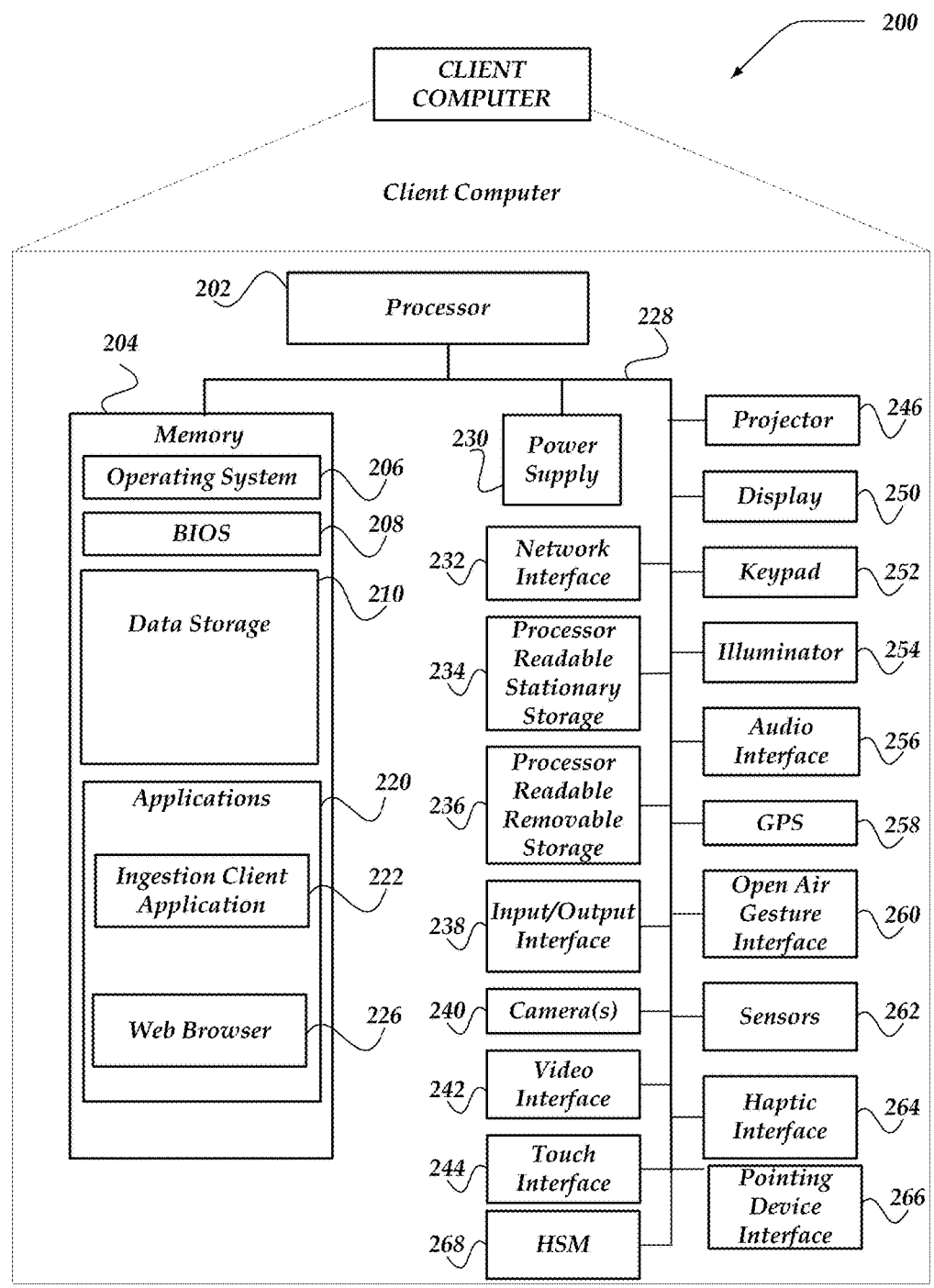
FIG. 2 shows one embodiment of a client computer that may be included in a system.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In at least one of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect and/or measure data that is external to client computer 200

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, benchmarking client application 222. In at least one of the various embodiments, benchmarking client application 222 may be used to exchange communications to and from cost modeling platform server computer 107, including, but not limited to, queries, searches, API calls, or the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of cost modeling platform server computer 107 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™ Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect and/or measure data that is external to network computer 300

In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, model data 312, benchmark data 314, one or more datasets 316, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include cost modeling application 322, benchmarking application 324, web server application 326, other applications 328, or the like, that may perform actions further described below. In at least one of the various embodiments, one or more of the applications may be implemented as modules and/or components of another application. Further, in at least one of the various embodiments, applications may be implemented as operating system extensions, modules, plugins, or the like.

In at least one of the various embodiments, applications, such as, cost modeling application 322, web server application 326, other applications 328, or the like, may be arranged to employ geo-location information to select one or more localization features, such as, time zones, languages, currencies, calendar formatting, or the like. Localization features may be used in user-interfaces and well as internal processes and/or databases. In at least one of the various embodiments, geo-location information used for selecting localization information may be provided by GPS 362. Also, in some embodiments, geolocation information may include information providing using one or more geolocation protocol over the networks, such as, wireless network 108 and/or network 111.

Furthermore, in at least one of the various embodiments, cost modeling application 322 and/or benchmarking application 324 may be operative in a cloud-based computing environment. In at least one of the various embodiments, these applications, and others, that comprise the management platform may be executing within virtual machines and/or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines and/or virtual servers dedicated to modeling application 322 and/or benchmarking application 324 may be provisioned and de-commissioned automatically.

Also, in at least one of the various embodiments, modeling application 322, benchmarking application 324, or the like, may located in virtual servers running in a cloud-based computing environment rather than being tied to one or more specific physical network computers.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

In at least one of the various embodiments, cost modeling application 322 may enable a user to generate budgets, allocation rules, recursive allocation, data model, cost models, total cost values for offerings, reports, or the like. Also in at least one of the various embodiments, modeling application 322 and/or benchmarking application 324 may employ processes, or parts of processes, similar to those described below.

Illustrative Logical System Architecture

Figure 4:
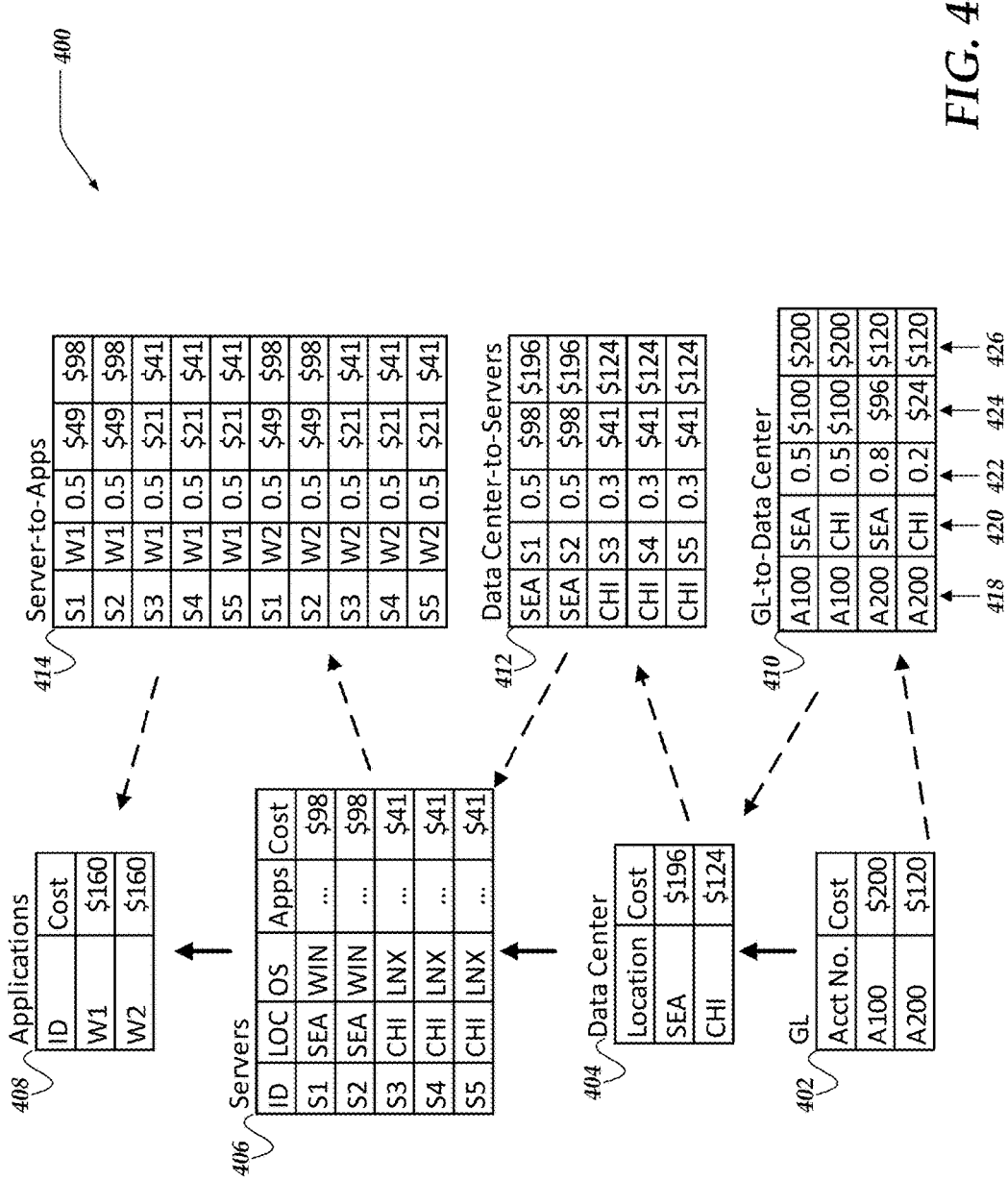
FIG. 4 illustrates a portion of a logical architecture for a data model that illustrates how resources may be allocated in a data model in accordance with at least one of the various embodiments.

FIG. 4 illustrates a portion of a logical architecture for data model 400 that illustrates how resources may be allocated in a data model in accordance with at least one of the various embodiments. Data model 400 is an example of a data model that may be arranged to model how resources, such as, money flow through a system and/or organization. Data model 400 is a simplified example that it used to describe some the concepts of the innovations included herein. One of ordinary skill in the art will appreciate that in practice data models may include hundreds or thousands of model objects each having up millions of model items. For example, data model 400 includes a GL (general ledger) object, GL object 402. In this example, GL object 402 is shown as having two accounts, account A100 and account A200. It will be well-known that in production environments there may be many more accounts in a business's General Ledger. Likewise, servers object 406 is shown as having five servers. However, in production environments, a servers object may represent thousands of servers. Furthermore, model objects used in production environments may have more and/or different columns depending on the configuration of the data model and the dataset used to generate the data model. Nevertheless, while data model 400 is a simplified representation of a data model it is sufficient to enable of one ordinary skill in the art to understand and practice the innovations included herein.

In this example, data model 400 may be arranged to include GL object 402, data center object 404, servers object 406, and applications object 408. The objects in the data model represent how money from GL object 402 may be distributed through a business system. Further, assignment ratio tables, such as, assignment ratio table 410, 412, and 414 may be defined to control how money may be distributed from one model object to another, Assignment ratio tables may be arranged to include allocation rules describing how resources flow from one model object in a data model to another.

In this example, data model 400 includes an assignment ratio table (assignment ratio table 410) to allocate money from GL object 402 to data center object 404. Also, in this example, data model 400 includes an assignment ratio table (assignment ratio table 412) to allocate money from data center object 404 to servers object 406. And, in this example, data model 400 includes an assignment ratio table (assignment ratio table 414) to allocate money from servers object 406 to applications object 406.

In at least one of the various embodiments, the details of how costs may be allocated from one object in the model to another may be encapsulated in one or more allocation rules. In at least one of the various embodiments, allocation rules may generate one or more assignment ratio tables that describe how cost values flow between the modeled objects. For data model 400, allocation rules may be described and illustrated in the form of assignment ratio tables 410, 412, and 414. In some embodiments, the allocation rules may define how an assignment ratio table may be arranged.

In at least one of the various embodiments, an assignment ratio table may be arranged to include one or more columns of information, such as, source object line item 418, target object line item 420, assignment ratio 422, allocation value 424, source value 426, or the like. In this example, the entries in the source object line item column 418 correspond to the line items in GL object 402. Namely, A100 and A200 (e.g., representing account names from a chart-of-accounts). Also, the entries in target object line item column 420 correspond to the line items comprising data center object 404 (e.g., SEA for Seattle and CHI for Chicago). The next column, assignment ratio column 422, contains a value for computing how much money flows from the source object line item to the target object line item. In this example, an allocation rule corresponding to assignment ratio table 410 causes the money from A100 to be evenly divided between location SEA and location CHI. Likewise, 80% (0.8) of the money from A200 is allocated to location SEA and 20% (0.2) is allocated to location CHI. Column 424 in assignment ratio table 410 shows the amount of money that flows from the source object line item to the target item. And column 426 shows the amount of money that the source object line item starts with. For example, based on GL object 402, A100 starts with $200 and A200 starts with $120. Thus, since the assignment ratio for A200 is 80% to location SEA, the line item for SEA is allocated $96 (approximately 80% of $120) while location CHI is allocated $24 (approximately 20% or $120). Likewise, since, in this example, A100 is evenly split with allocation ratio 50% or 0.5 between location SEA and location CHI, each location is allocated $100. In at least one of the various embodiments, the values in data center object 404 reflect the application of the allocation rules corresponding to assignment ratio table 410. Similarly, the remaining objects in model 400 may be allocated costs based on their respective allocation rules and corresponding assignment ratio tables.

In at least one of the various embodiments, the underlying reason for employing a particular allocation rule may depend on the objects that are being modeled. For example, in model 400, account A100 is modeled as a line item in GL object 402 and it may represent the costs/money allocated to operating a Seattle based data center. And A200, also modeled as a line item in GL object 402, may represent the costs/money allocated to operating a Chicago based data center.

Likewise, in this example, referring to assignment ratio table 412, money is allocated from to the servers items. In this example, money allocated to the Seattle data center (SEA in data center object 404) is split between two servers, S1 and S2, while money allocated to the Chicago (CHI) data center is split between three servers (e.g., S3, S4, S5).

Finally, data model 400 models how money is allocated from servers object 406 to applications represented by application object 408. In this case, assignment ratio table 414 shows that the costs allocated to each server are evenly allocated to application W1 and application W2. For examples, the first line of assignment ratio table 414 shows that half of the costs of server S1 ($49) are allocated to application W1 with the other half of the costs of server S1 ($49) are allocated to application W2. Similarly, the costs associated with the other servers (S2-S5) are split between application W1 and W2.

Accordingly, in at least one of the various embodiments, data models, such as, data model 400 enable reports to be generated that answer various questions about how resources are allocated throughout the modeled business system. For example, data model 400 shows that the $320 that entered the system through GL object 402 is split evenly between applications W1 and W2.

Likewise, data model 400 easily answers questions, such as, how much money is allocated to each server located in Seattle? The answer of $98 for each server is readily derived from servers object 406. Generally, models such as data model may enable detailed reporting on how money (or other resources) flow between object that are adjacent in the data models. Reports such as tracing the costs from one object to another may be efficiently generated as long as there are no intervening objects in the model.

One of ordinary skill in the art will appreciate that model objects and tables such as those described above may be arranged to have more or fewer features, columns, rows, or the like. Likewise, data models may be arranged in different geometries and have more (many more) or fewer model objects depending on the application and/or the business system being modeled. Also, data models may be arranged to model the allocation of different resources, such as, financial resources (money), energy, water, power, or the like, among different parts of an enterprise or organization.

In at least one of the various embodiments, line items for the various data model objects may be generated based on actual datasets for the business/system that may be represented by a data model. In this example, GL object 402 has line items that correspond to accounts in a business's GL ledger. Data center object 404 includes line items that represent each data center; servers object 406 includes line items that represent each server computer in the organization.

Accordingly, in at least one of the various embodiments, the line items may be generated from raw datasets that may be ingested to produce the line items. In at least one of the various embodiments, an ingestion engine, such as, ingestion engine 324 may be arranged to transform provided raw data set records into model line item records. In at least one of the various embodiments, the ingestion engine may be arranged to use one or more ingestion rules that define/describe one or more actions to take on the raw data to ensure the model objects are accurate and/or consistent.

For example, in at least one of the various embodiments, the raw data records may include one or more errors that result in inconsistent and/or ambiguous values. In some embodiments, raw records may come from different sources within an organization. Accordingly, in some cases, the different sources (e.g., separate department, business groups, and so on) use different names/descriptions to identify the same concept. For example, the marketing department may record information about their IT resources using different abbreviations and/or short hand notations that the engineering department. Accordingly, if the two departments separate maintain their own records there may be mismatches.

Similarly, in some embodiments, the raw data may simply contain errors, such as, typographical errors that may need to be recognized and cleaned up. Also, in some cases, a company may have legacy data that uses different nomenclature than the newer data.

Figure 5:
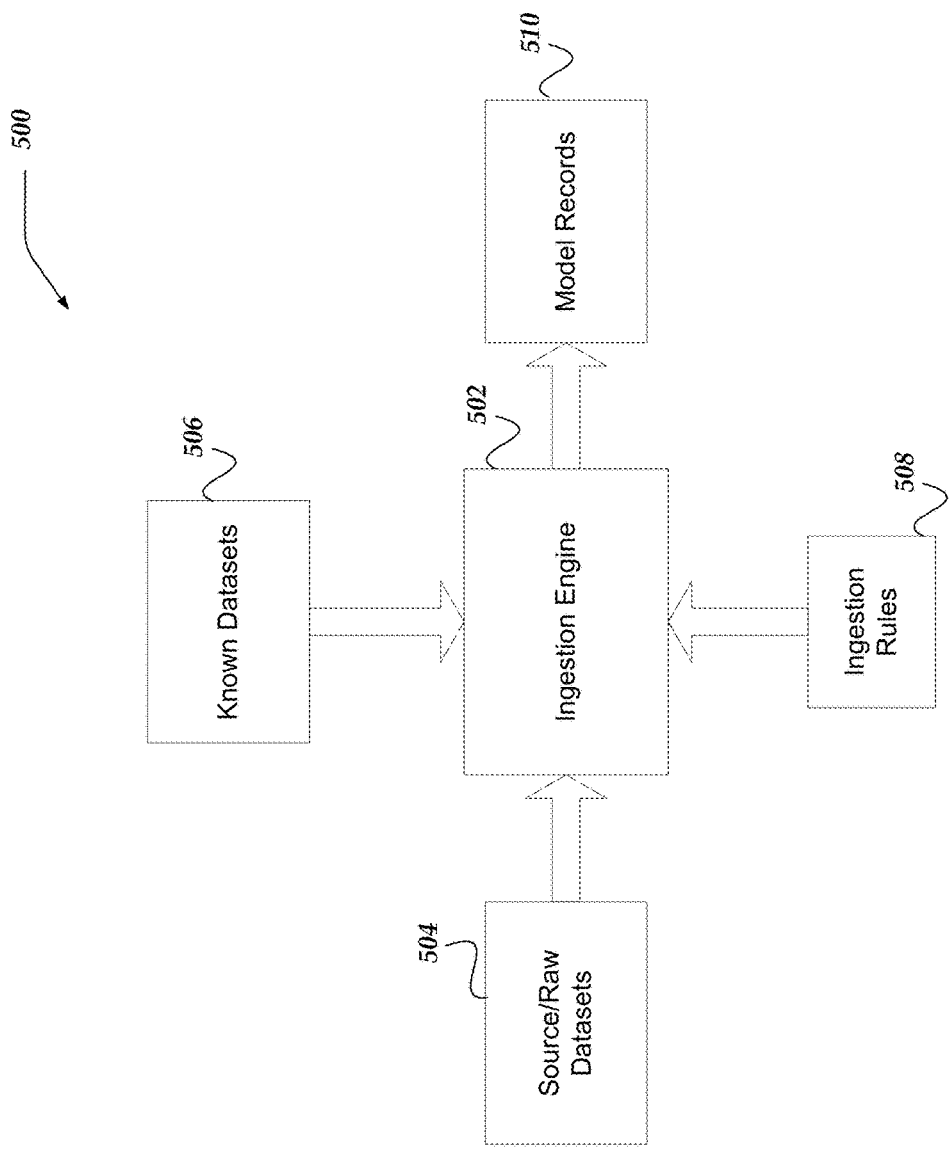
FIG. 5 illustrates a logical system for normalizing ingested data sets based on fuzzy comparisons to known data sets in accordance with at least one of the various embodiments.

FIG. 5 illustrates logical system 500 for normalizing ingested data sets based on fuzzy comparisons to known data sets in accordance with at least one of the various embodiments. In at least one of the various embodiments, system 500 may include: an ingestion engine, such as, ingestion engine 502; one or more raw data sets, such as, raw data set 504; one or more known data sets, such as, known data sets 506; ingestion rules, such as, ingestion rules 508; or the like. In at least one of the various embodiments, ingestion engine 502 may employ raw data set 504, known data sets 506, and ingestion rules 508 to provide model records 510.

In at least one of the various embodiments, model records 510 may represent records that have been normalized in the sense that where multiple values in the raw data represented the same concepts, one representation/value for that concept is used in the model records.

In at least one of the various embodiments, model records may be normalized such that spelling errors may be corrected, divergent abbreviations and/or short hand notations, different values representation the same thine, are "normalized" to common values/representations that may be used in the model record.

In at least one of the various embodiments, known data sets 506 may include lexicographic information that may be used to provide normalized values that one or more raw value may be mapped. In at least one of the various embodiments, known data sets 506 may include information organized based on various characteristics, such as, area of industry (e.g., health industry, financial industry, various manufacturing industries, or the like), type of objects (e.g., servers, vendors, locations, jobs, applications, or the like), custom naming conventions, or the like, or combination thereof.

For example, in at least one of the various embodiments, if a raw data set includes records containing server information for an organization, one or more known data sets the contain server information may be provided for use by the ingestion engine. In this example, the known data set may include lists of server manufacturers and various product information, such as, model numbers, brand names, CPU type, or the like.

Also, in some embodiments, the known data sets may include mapping information that maps various ad hoc/colloquial/casual names that may be used for the known items to a common name. For example, depending on the source of the raw data, different names may be entered into the data for same kind of item. In some cases, the data may be represented using abbreviations, in other cases, the raw data may be spelled using different/various capitalization, spelling, and so on. Accordingly, in at least one of the various embodiments, the known data set may include mappings from one or more casual values to a common value that may be used for the model data sets.

Further, the known data sets may be used to confirm that the information in the source data sets is correct. For example, if the source data records includes a list of desktop telephones, known data sets that list every available desktop telephone (e.g., manufacturer, brand, model, or the like) may be used to confirm that the information in the raw data is correct. Accordingly, in this example, if a record for one or more desktop telephones cannot be mapped to a known telephone in the known dataset, a user may be alerted to the discrepancies so corrections to the data may be made.

In at least one of the various embodiments, known data sets may be hosted and/or provided by external systems. In some cases, the external systems may be vendor or in other cases they may be part of the same organization that is operating the ingestion engine. But in any case, external known data sets may separate from the ingestion engine. Accordingly, in at least one of the various embodiments, external known data sets may be accessible over wireless and/or wired networks.

In at least one of the various embodiments, an ingestion engine may be arranged to communicate over a network to access the provided known data sets. In some embodiments, the known data sets may be indirectly accessed using an API that enables the ingestion engine to communication queries regarding values included in the raw records. In other embodiments, some or all of the known data sets may be communicated to the ingestion engine for the user in mapping between raw record values and model record values.

In at least one of the various embodiments, some or all of the known data sets information may be cached or otherwise stored locally. In some embodiments, the ingestion engine may be arranged to periodically poll the various sources of the known data set to query if there may be changes or updates to the data that may need to be retrieved or otherwise considered.

In at least one of the various embodiments, one or more sources of the known data sets, such as, data source server computer 109, may be arranged to communicate a notification to the ingestion engine that may indicate that some or all of the known data sets have been changed or modified. In some cases, the ingestion engine may be unable to access the known data sets. In some cases, the network communication with the known data sets may be unavailable.

Accordingly, in at least one of the various embodiments, if the ingestion engine is activated and there may be a pending change notification, the ingestion engine may initiate a communication over the network to obtain the update known data sets. For example, when the network communication path to the data source computer is inactive or otherwise disabled, caches at least a portion of the known data sets until the communication path is enabled again. Further, when the network communication path is enabled again, the ingestion engine may obtain the cached and any other known data set information.

Similarly, raw data sets, such as, raw data sets 504 may be provided by one or more data source server computer, such as, data source server computer 109. These may be the same or different than the data source servers that provide known data sets. Accordingly, in some embodiments, data source servers may communicate notifications over a network indicating that raw data is available for ingestion. In some cases, when network communication with the data source servers is inactive or otherwise disabled, the raw data is cached. Further, when the communication between the data source servers and the ingestion engine is enabled again, the data source servers may communicate a notification indicating that the network communication (e.g., a network connection) has been re-established. Also, when the network connection is re-established, the ingestion engine may be arranged to obtain any cached and remaining raw data records—if any.

Also, in at least one of the various embodiments, a notification may be provided from another source, including a user. Such notifications may indicate that one or more known data sets have changed and/or one or more raw data sets are available for ingestion. Accordingly, in at least one of the various embodiments, when the ingestion engine establishes network communication with the one or more data source servers it may, in acknowledgement of the notifications, obtain the updated known data sets or obtain the raw data sets for ingestion.

In at least one of the various embodiments, ingestion rules may include one or more sets of instructions/conditions for transforming raw data records into model data records. In at least one of the various embodiments, the ingestion rules may be arranged to normalize values includes in raw data records to the values that comprise the model data records. Normalizing in this context can mean to map/transform various input values to common values, and the like, rather than being limited to arithmetical normalization.

In at least one of the various embodiments, ingestion rules may be arranged to compare raw data values with values in the known data sets to determine the common value(s) for to use in the model records. In at least one of the various embodiments, one or more rules may include patterning matching instructions that may compare values in the raw data records with known data set value.

In at least one of the various embodiments, ingestion rules may be arranged to employ fuzzy matching that produce a probability score indicating a confidence of the fuzzy match of the raw data to known data. In some embodiments, ingestion rules may include one or more defined confidence value thresholds that indicate if a match may be accepted automatically, discarded/discounted automatically, or presented to a user for confirmation.

In at least one of the various embodiments, the ingestion engine may be arranged to track user feedback with respect to matches and use that information to update the confidence values. For example, raw data for an organization may include one or more non-standard/non-obvious values for model items. As users provide feedback the mapping for non-standard values may be learned and incorporated into the ingestion rules. For example, an organizations raw data may use internal numerical codes for different types of server computers. Accordingly, in this type of example, known data sets may not be helpful for matching the items. But as users manually map the numerical value to specific model items, the ingestion engine may learn how to map the numerical codes in the future.

Also, in at least one of the various embodiments, ingestion rules may be arranged to scan more than one field in the raw records to determine a correct mapping/transformation for the model records. In some embodiments, there may be information scattered across different fields/columns of the raw data records that may be viewed as a whole to make a determination for a mapping/transformation to a model record.

In at least one of the various embodiments, one or more of the ingestion rules may be arranged based on prior knowledge of the structure and/or fields of the raw records. Accordingly, one or more fields of the raw data record may be used for mapping directly to a field of the model record. For example, in at least one of the various embodiments, if raw records may include a field labeled 'Name' that is known to include the hostname of server computers, the ingestion rule may be arranged to directly map the Name fields to the Hostname field of the model record.

Continuing with the same non-limiting example, in other embodiments, in the absence of prior knowledge, the ingestion rules may be arranged to scan raw data records to look for contents that appear to be a hostname and then map those values into a model record's hostname field.

Figure 6:
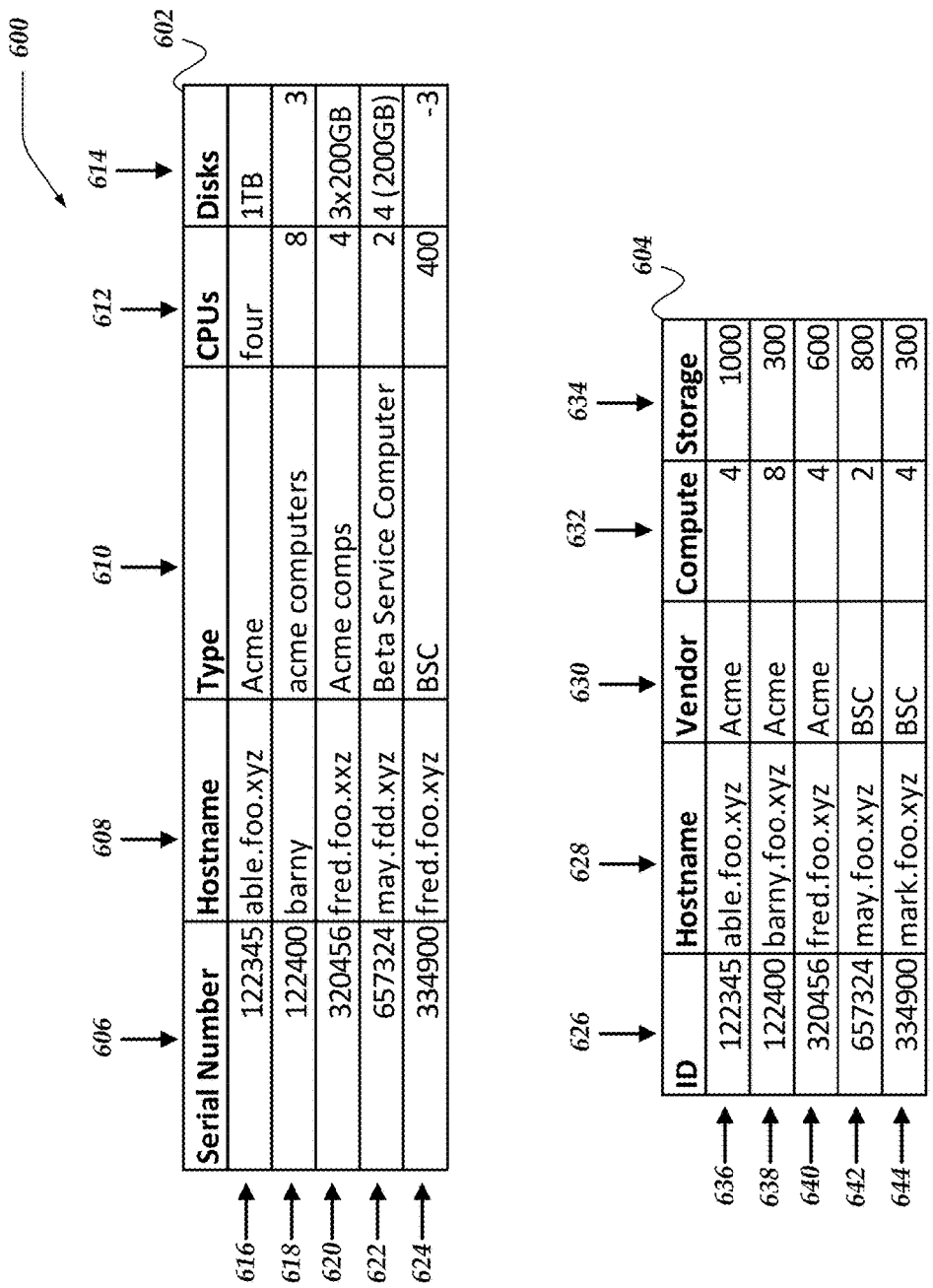
FIG. 6 illustrates a portion of a data set where raw data is transformed into model data in accordance with at least one of the various embodiments.

FIG. 6 illustrates a portions of data sets 600 where raw data is transformed into model data in accordance with at least one of the various embodiments. As described above, in at least one of the various embodiments, raw data may be provided in various formats. In some embodiments, raw data may be provided using a table, such as, table 602. In this example, table 602 has columns based on the composition of the data in its raw form. In this example, the raw data is server computer data that describes a few of the server computers that may be in use for an organization.

In at least one of the various embodiments, table 602 has column 606 the contains the serial number of the server computer, column 608 contains the hostname, column 610 may be arranged to contain a type description for the server computers, column 612 may include the number of CPUs, and column 614 may contain values representation the storage capacity included with the server computer.

In this example, rows 616-624 may be different raw data records that each represent a different server computer. In this example, table 602 includes examples of raw data discrepancies that may need to be normalized and/or transforms by the ingestion engine.

For example, column 608 of table 602 holds hostnames. Accordingly, row 616 shows that hostname for a server computer as able.foo.xyz but row 618 show a hostname value as barny. This may indicate that the hostname value for row 618 is incorrect since it does not include a domain name like the other server computers in the table. In this example, the hostname for row 618 may have been entered incorrected when the server for row 618 was entered into the raw data database.

Likewise, in this example, column 610 shows that the server computer corresponding to rows 616-620 are probably all of the type Acme but each raw record contains a different value. Also, similarly, row 622 and row 624 also have discrepancies in their type column, Beta Service Computer for row 622 and BSC for row 624.

Other error examples include row 620 that appears to have an incorrect domain name component of its hostname (foo.xxz rather than foo.xyz). Also, values for the number of CPUs in table 602 appear to be inconsistent as well as values for Disks.

In this example, table 604 shows model records that have been generated using an ingestion engine, ingestion rules, known data sets, or the like. In this example, table 602 has the same number of columns as table 602. However, one of ordinary skill in the art will appreciate that this is not a limitation required by these innovations. A model record may have more or fewer columns than its associated raw data record. Also, in some cases, a single raw data record may produce multiple model records, or multiple raw records may be combined into one model record.

In at least one of the various embodiments, an ingestion engine may apply one or more ingestion rules to raw data records to produce model records such as those shown in table 604.

In this example, the ingestion engine has mapped column 606 labeled Serial Number to column 626 that in this example is labeled ID. In contrast, in this example, column 608 of table 602 labeled Hostname is mapped to column 628 of table 604 also labeled Hostname. Further, in this example, data from column 610 of table 602 labeled Type is mapped to column 630 of table 604 labeled Vendor, data from column 612 of table 602 labeled CPUs is mapped to column 632 of table 604 labeled Compute, and data from column 614 of table 602 labeled Disk is mapped to column 634 of table 604 labeled Storage. Accordingly, rows 636-644 of table 604 are model records that have been mapped and/or transformed from raw data records in rows 616-624 of table 602.

In at least one of the various embodiments, ingestion rules used by the ingestion engine may be arranged to correct errors in the raw data and/or normalize some or all of the values to common values that may be used as value in model records.

In this example, comparing raw data record 616 (in table 602) to model record 636 (in table 604) it can be observed that an ingestion engine has application one or more rules to transform data in row 616 to data in row 636. In this case, the CPUs value in row 616 is 'four' in row 636 the ingestion engine has transformed the value to 4 and placed in it the column 632 (Compute). Likewise, the row 616 value for Disks (column 614) is transformed from 1 TB to 1000 (row 636 of table 604).

Similarly, in this example table 604 shows other examples of normalization and/or transformation of data from the raw data record to the model records. In general, values for CPUs in table 602 are converted to values in the Compute column of table 604. Also, values for Disks (column 614) in table 602 are converted to numerical storage values in column 634 of table 604.

Further, in this example, the ingestion engine has corrected the hostname error for row 618 by adding the domain name to the hostname value stored in table 604. Also, in this example, the domain name error in row 620 column 608 is correct in row 640 column 628. And, the value in table 602 column 610 have been normalized to vendor name in column 630 of table 604.

Generalized Operations

FIGS. 7-11 represent the generalized operations for normalizing ingested data sets based on fuzzy comparisons to known data sets in accordance with at least one of the various embodiments. In at least one of the various embodiments, processes 700, 800, 900, 1000, and 1100 described in conjunction with FIGS. 7-11 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, or the like may be utilized. Further, in at least one of the various embodiments, the processes described in conjunction with FIGS. 7-11 may be operative in cost modeling and benchmarking architectures such as those described in conjunction with FIGS. 4-6.

Figure 7:
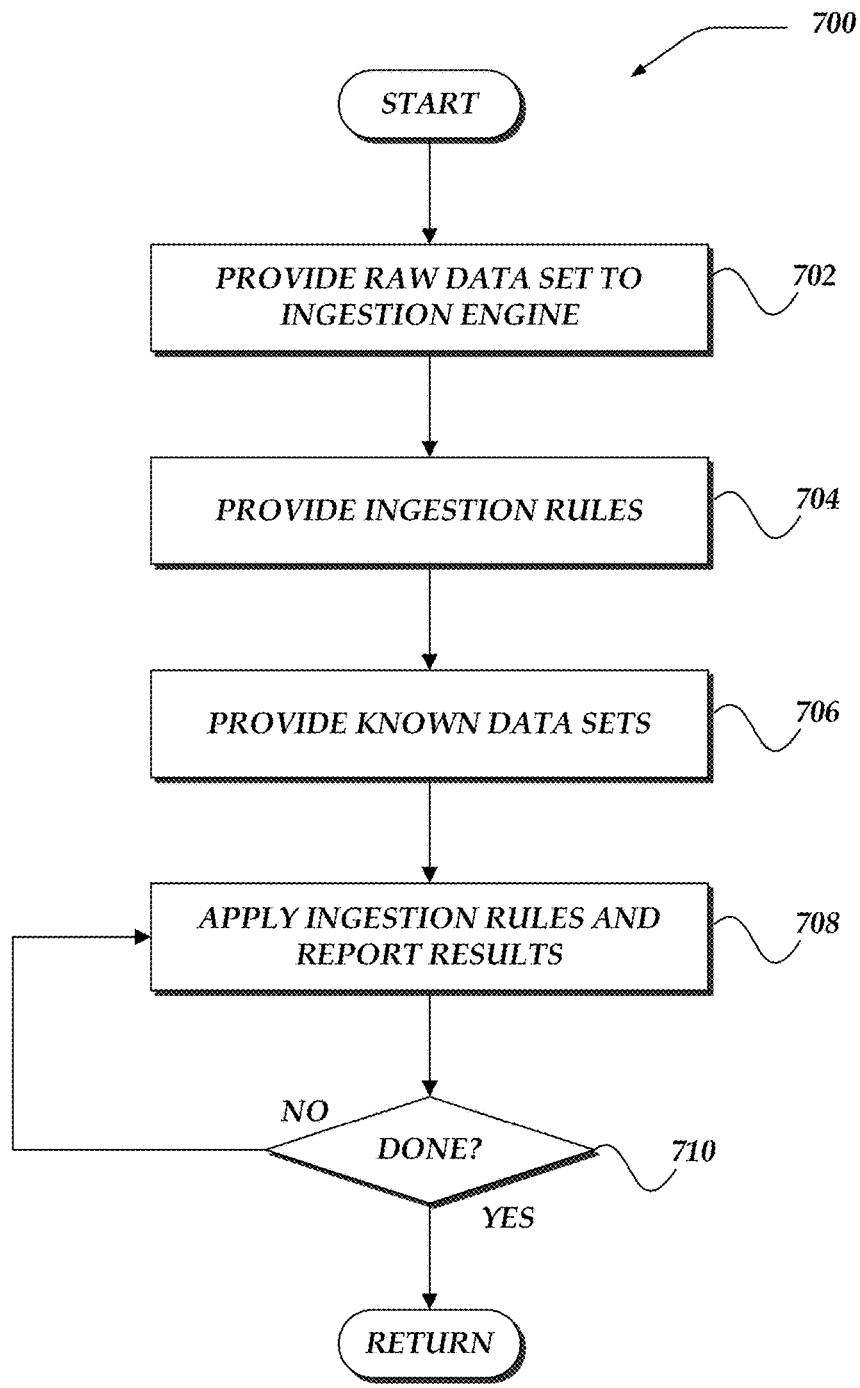
FIG. 7 illustrates a flowchart for a process for normalizing ingested data sets based on fuzzy comparisons modeling in accordance with at least one of the various embodiments.

FIG. 7 illustrates a flowchart for process 700 for normalizing ingested data sets based on fuzzy comparisons modeling in accordance with at least one of the various embodiments. After a start block, at block 702, in at least one of the various embodiments, one or more raw data sets may be provided to an ingestion engine. In at least one of the various embodiments, raw data sets may be comprised of files, database dumps, database result sets, inventory lists, project histories, employee/contractor payroll records, financial information, General Ledger (GL) data, or the like, or combination thereof. As discussed above, the raw data sets may be provided to an ingestion engine, such as, ingestion engine 324 for processing.

In at least one of the various embodiments, the raw data sets may be provided via a network, file system, database/service API, or the like, or combination thereof. In some embodiments, raw data sets may be provided by one or more data source servers, such as data source server computer 109, or the like. In at least one of the various embodiments, data source servers may be communicated with over a network, such as, network 111 or wireless network 110.

At block 704, in at least one of the various embodiments, one or more ingestion rules may be provided. In some embodiments, one or more of the data sets may be categorized as relating to a particular object in the model. For example, raw data sets that are known to list server computers for an organization may be pre-categorized such that the content of its raw records are going to processed to produce model line items for a server object in the model.

In at least one of the various embodiments, ingestion rules may be arranged to classify in coming data sets records on the fly. In some embodiments, raw data records for different model object may be included in the same raw data set. Accordingly, in some embodiments, ingestion rules may be arranged to map the raw data records to model object line items on the fly.

Accordingly, in at least one of the various embodiments, one or more ingestion rules may be determined to be associated with the provided raw data sets. In some cases, one or more of the rules may be assigned based on prior knowledge of the type of model objects the raw data sets may be associated with. In other cases, there may be one or more ingestion rules that may be arranged to determine additional rules to use based on their initial classification of incoming raw data sets.

In at least one of the various embodiments, some ingestion rules may be rules that perform comparisons, substitutions, transformations, or the like, for commonly encountered data that may be found in different organizations. For example, there may be one or more system-wide ingestion rules that may be used for date/time formatting, localization, spell checking, physical address lookup/verification, email address format verification, or the like. Common rules may be available for separate organizations that may be employing the ingestion system.

Also, in at least one of the various embodiments, some separate organizations may use the same standards for maintaining their raw data sets. For example, if the raw data sets are storing information technology resource information two or more organization may employ one or more standards that define a well-known format and/or lexicon for representing their data. Accordingly, the ingestion engine may have one or more predefined ingestion rules that are arranged to perform ingestion processing for raw data sets provided by separate organizations.

Further, in at least one of the various embodiments, there may be customized ingestion rules that are designed for a particular organization. In some embodiments, organization may employ unique formats and/or lexicons for storing their raw data sets. Accordingly, in at least one of the various embodiments, an ingestion engine may be arranged to associate one or more custom/customized ingestion rules with a particular organization.

At block 706, in at least one of the various embodiments, one or more known data sets may be provided. In at least one of the various embodiments, one or more ingestion rules may employ one or more known data sets to perform fuzzy matching of raw data values. In at least one of the various embodiments, ingestion rules may be arranged to confirm raw data values such as vendor names, device model numbers, brand names, employee names, telephone numbers, addresses, or the like. Accordingly, such ingestion rules may be arranged to perform pattern matching of the raw data values using values from one or more known data sets. For example, if a data from a raw data record is supposed to be a vendor name, a known data set of vendor name may be provided to determine/confirm which vendor is included in the raw record. (See, FIG. 6).

As described above, in at least one of the various embodiments, the known data sets may be provided via a network, file system, database/service API, or the like, or combination thereof. In some embodiments, known data sets may be provided by one or more data source servers, such as data source server computer 109, or the like. In at least one of the various embodiments, data source servers may be communicated with over a network, such as, network 111 or wireless network 110.

At block 708, in at least one of the various embodiments, one or more of the ingestion rules may be applied by the ingestion engine. In at least one of the various embodiments, the ingestion engine may be arranged to determine one or more ingestion rules and apply them to provide raw data sets. As described above, the ingestion rules may be arranged to take one or more raw data records and produce one or more associated model records. In at least one of the various embodiments, the ingestion rules may be arranged to perform comparisons, matching, substitutions, transformations, or the like, to produce one or more model records from the provided raw data records.

At decision block 710, in at least one of the various embodiments, if the ingestion engine is finished processing the one or more raw data sets, control may flow to block 708; otherwise, control may be returned to a calling process. In at least one of the various embodiments, an ingestion engine may be arranged to perform one or more interactive sessions that enable users to observe and review the ingestion process. In some embodiments, the interactive session may include a user interface that shows which provided raw data records remain unmatched to one or more ingestion rules. In some cases, if the ingestion rules and/or raw data sets are well-defined the ingestion process may perform to completion without user interaction.

Further, in at least one of the various embodiments, an ingestion engine may be arranged to obtain notification communications from one or more data source server computers. In some embodiments, notifications may be communicated over a network, such as, network 111 and/or wireless network 110. If a data source server that has raw data sets and/or known data sets that need to be communicated to the ingestion engine, it may provide a notification to the data source server using a network.

In at least one of the various embodiments, for a given organization, as more raw data sets are observed and/or processed more ingestion rules may be created or modified by users. Eventually, the ingestion rules should be trained to able to process the raw data sets without user intervention.

Figure 8:
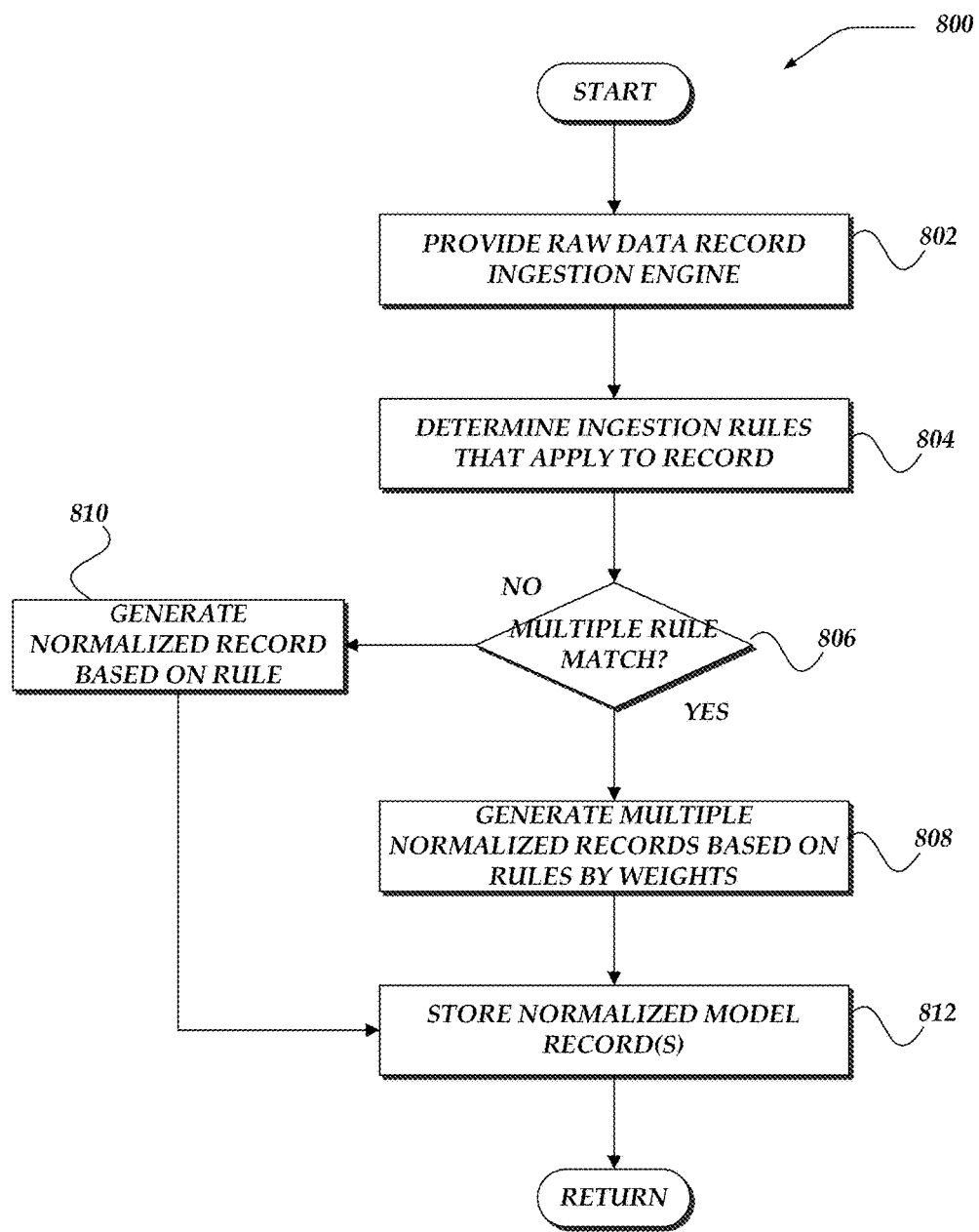
FIG. 8 illustrates a flowchart for a process for normalizing ingested data sets based on fuzzy comparisons modeling in accordance with at least one of the various embodiments.

FIG. 8 illustrates a flowchart for process 800 for normalizing ingested data sets based on fuzzy comparisons modeling in accordance with at least one of the various embodiments. After a start block, at block 802, in at least one of the various embodiments, a raw data record may be provided to the ingestion engine.

At block 804, in at least one of the various embodiments, one or more ingestion rules may be determined.

At decision block 806, in at least one of the various embodiments, if more than one of the ingestion rules matches the ingestion record, control may flow to block 808; otherwise, control may flow to block 810.

At block 808, in at least one of the various embodiments, more than one model record may be generated, one for each ingestion rule that may have been determined to apply to the raw data record. In at least one of the various embodiments, the raw data record may include one or more quantifiable resource values that may be split among the multiple model records, such as, financial cost, storage capacity, compute capacity, or the like. For example, in FIG. 6 the server computers represented in table 602 have CPUs and Disk that correspond to Compute and Storage in table 604. Accordingly, in at least one of the various embodiments, if a server computer raw data record in table 602 matched two or more ingestion rules, the value for Compute and Storage may be distributed across multiple model records (at least one model record per ingestion rule match). For example, if a raw server computer record is determined to represent both a database server and a webserver, the Compute value derived from the single raw data record may be split between a model record that represents a web server computer and a model record that represents a database server.

In at least one of the various embodiments, each ingestion rule may include a weight score that may be used to determine a weighting value that may be used if resources from a single raw data record are distributed among multiple model records. For example, if a single raw data record is matched by an ingestion rule that signifies an application server and it is matched by another ingestion rule that signifies database server, the weight values of the of the two ingestion rules may be compared to determine the proportion of resources that should be allocated to the two model records (one for the application server and one for the database server). Separate weight values may be associated with one or more separate fields in the model records (e.g., cost, storage, or compute may have different weights). If there are no specific weight defined resource may be split evenly among the model records.

At block 810, in at least one of the various embodiments, since one ingestion rule matches the raw data record, the ingestion engine may generate one model record that corresponds to the raw data record.

At block 812, in at least one of the various embodiments, the model record may be stored in database. In at least one of the various embodiments, each model record may correspond with a model item that is part of a model object. For example, model 400 in FIG. 4 shows model objects: GL object 402; Data Center object 404; Servers object 406; and Application object 408. In that example, each line item of the model object may be generated from a model record that may be produced from one or more raw data records.

In at least one of the various embodiments, in addition to storing the model record, the ingestion engine may be arranged to associate the particular ingestion rules that were used to generate the model record. Accordingly, in at least one of the various embodiments, given a model record, the one or more ingestion rules that may have participated in the generation of the model record may be identified and/or reviewed. Next, control may be returned to a calling process.

Figure 9:
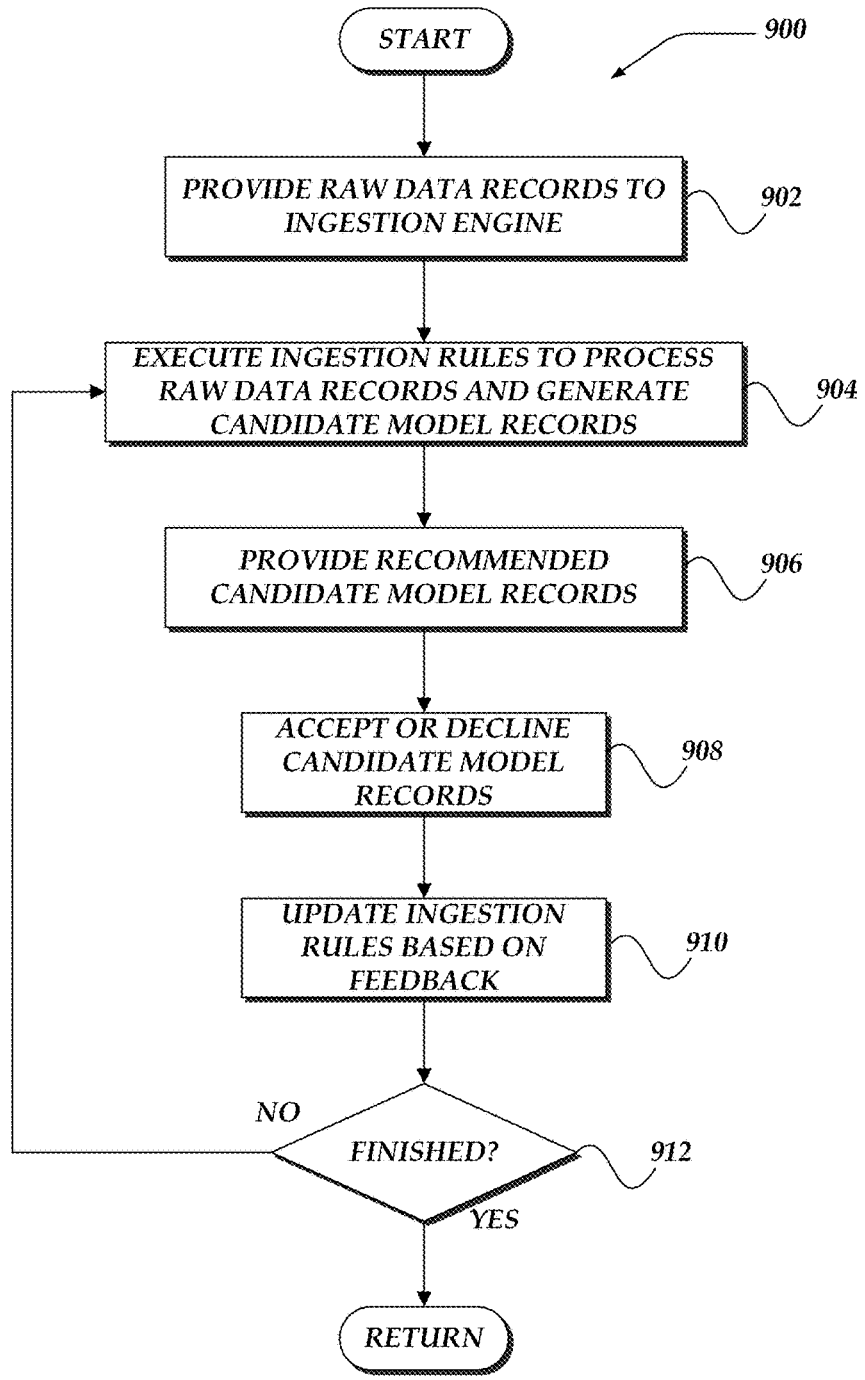
FIG. 9 illustrates a flowchart for a process for generating a normalized model record in accordance with at least one of the various embodiments.

FIG. 9 illustrates a flowchart for process 900 for generating a normalized model record in accordance with at least one of the various embodiments. After a start block, at block 902, in at least one of the various embodiments, raw data records may be provided to an ingestion engine.

At block 904, in at least one of the various embodiments, one or more ingestion rules may be executed to process raw data records and generate one or more candidate model records. In at least one of the various embodiments, an ingestion engine may be arranged to apply one or more ingestion rules to the provided raw data records to produce one or more candidate model records. In some embodiments, these model records may be considered candidate model records since they have not been confirmed by a user and/or an automatic confidence test.

In at least one of the various embodiments, some of the ingestion rules may be arranged to map values in the raw data records to one or more known values that may be included in one or more known data sets. For example, a vendor name may be stored in the raw data sets using a variety of formats (See, FIG. 6). Accordingly, in at least one of the various embodiments, in this example, ingestion rules may be arranged to map the various representations of the vendor (e.g., spellings, abbreviations, capitalization, short form, long form, and so on) to a uniform representation that may be used in the model. Thus, in at least one of the various embodiments, the different representation included in the raw data records may be normalized to a common representation for the model records that may be used in the model.

At block 906, in at least one of the various embodiments, the one or more candidate model records and/or relevant data mappings, transformations, substitutions, or the like, may be provided to a user. In at least one of the various embodiments, the recommendations may be displayed to a user in a graphical user-interface that enables a user to observe the raw data records, the candidate model records, and/or the ingestion rules that may or may not have been applied by the ingestion engine.

At block 908, in at least one of the various embodiments, the candidate model records may be accepted or declined by a user. In at least one of the various embodiments, users may be enabled to provide the corrections to the substitutions/transformations that may be used to override transformations made by the ingestion engine. Likewise, in at least one of the various embodiments, the users may be enabled to generate new ingestion rules and/or modify existing ingestion rules based on an observation of the match and/or unmatched raw data records and/or the candidate model records.

At block 910, in at least one of the various embodiments, the feedback from the users may be employed to update the ingestion rules. For example, ingestion rules that produce false positive values may have their confidence score reduced. Likewise, ingestion rules that produce correct results may have their confidence value increased.

In at least one of the various embodiments, the ingestion engine may be arranged to track if a user has changed transformation values. For example, if an existing ingestion rules is arranged to map 'acme computers' to 'Acme Computer, LLC', as user may be enabled to edit the transformation to 'Acme'. Accordingly, the transformation associated with the ingestion rule may be updated based on user feedback to transform all Acme Computer matches to Acme.

At decision block 912, in at least one of the various embodiments, if the generation of the model records may be finished, control may be returned to a calling process; otherwise, control may be loop back to block 904.

In at least one of the various embodiments, the user may continue the process of accepting and/or decline ingestion rule results until the model data records are in a condition that is acceptable to the user. In at least one of the various embodiments, the ingestion engine may be arranged to prevent finalization for of the model records if outstanding conflicts and/or discrepancies exist.

For example, referring to FIG. 6 an ingestion rule may require that each Serial Number in table 604 correspond to a serial number value stored in another table, such as, a separate computer equipment inventory database of the organization. Accordingly, in this example, if the serial number for a record in table 604 is not found as required, the ingestion rule may prevent the ingested data from being finalized since there remain unsatisfied rules.

Figure 10:
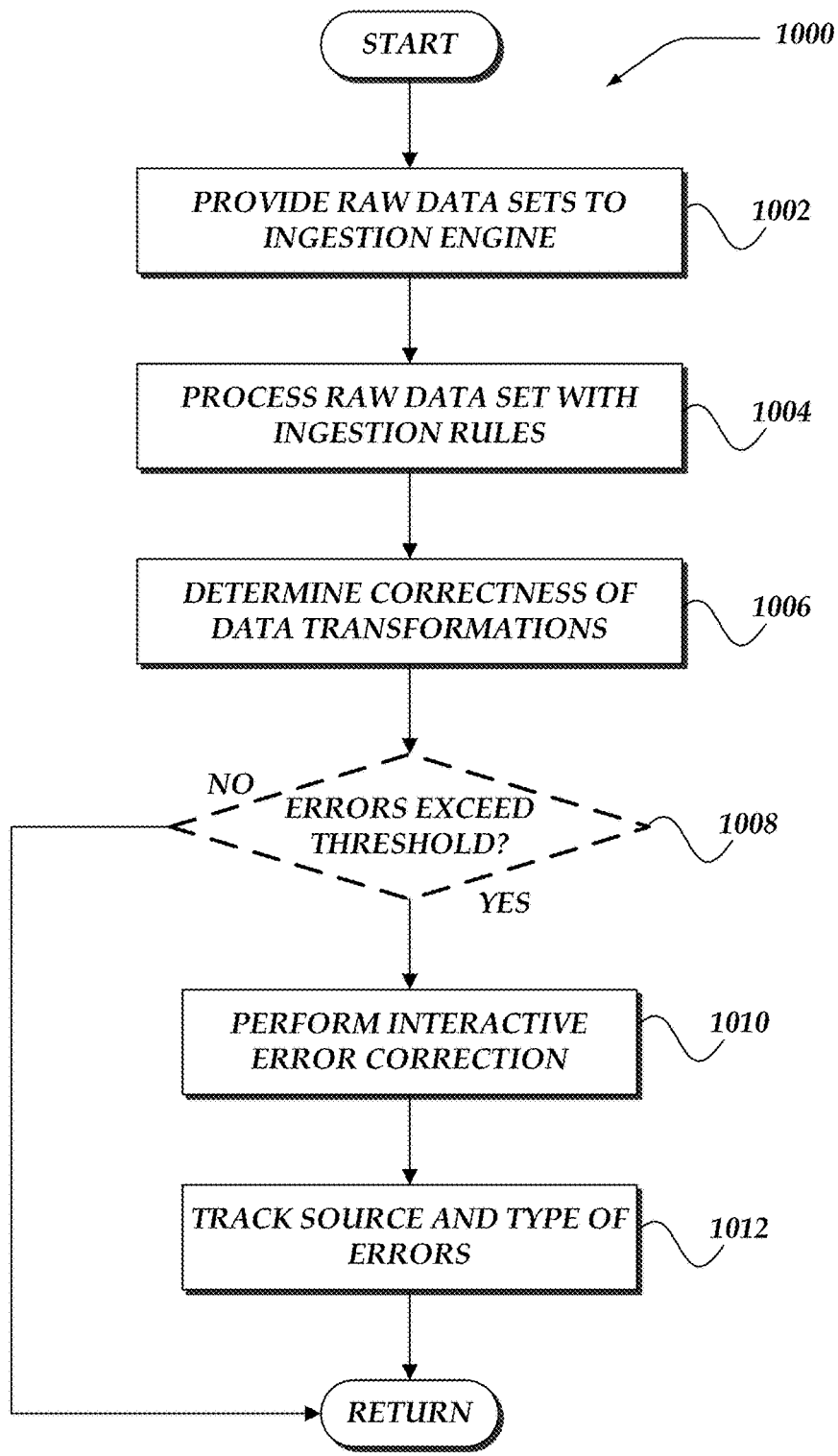
FIG. 10 illustrates a flowchart for a process for generating a normalized model record in accordance with at least one of the various embodiments.

FIG. 10 illustrates a flowchart for process 1000 for generating a normalized model record in accordance with at least one of the various embodiments. After a start block, at block 1002, in at least one of the various embodiments, as described above, one or more raw data sets may be provided to an ingestion engine, such as, ingestion engine 324. At block 1004, in at least one of the various embodiments, the ingestion engine may process the raw data sets using one or more ingestion rules (as described above).

At block 1006, in at least one of the various embodiments, the results from processing the raw data sets may be evaluated for correctness. Correctness may include taking into account confidence scores associated with one or more results. In some case, there may be a set of specific ingestion rules that may be used for determining correctness. For example, after the ingestion process is complete a final set of rules may be executed to perform correctness checks. In some embodiments, rules may be executed that confirm that fields of candidate model records are present if required.

At decision block 1008, optionally, if the number of errors exceed a one or more defined thresholds, control may flow block 1010; otherwise, control may be returned to a calling process. In at least one of the various embodiments, there may be a defined number/percentage of errors that may be acceptable. Also, in at least one of the various embodiments, there may be different types/severity of errors each with their designated error count threshold. For example, in at least one of the various embodiments, errors in fields that are not used in the data model may have a higher number of allowed of errors since they do not impact how the data model is arranged. Likewise, some errors, such as, missing/unknown values for critical fields of model records may have a lower threshold of errors since they may directly impact the integrity of the model.

In at least one of the various embodiments, if none of the error thresholds are exceeded that ingestion engine may presume that the raw data sets are processed successfully. Accordingly, in at least one of the various embodiments, control may be returned to a calling process.

At block 1010, in at least one of the various embodiments, perform interactive error correction, since the raw data sets have not yet been processed completely/successfully, the ingestion engine may enter into an interactive session with one or more users to correct the data ingestion errors. See, FIG. 9. The interactive session may result in new ingestion rules, modification of ingestion rules, correction of raw data records, discarding of raw data records, or the like.

In at least one of the various embodiments, the ingestion engine may be arranged to communicate a notification to an ingestion client application, such as, ingestion client application 222 that is executing on a client computer, such as, client computer 200. In at least one of the various embodiments, the notification may be communicated over a network such as network 110 and/or wireless network 111. In some embodiments, the ingestion client application may be arranged to operate in environments where network conditions are unstable or randomly unavailable for periods of time.

Accordingly, in at least one of the various embodiments, upon reactivation and/or reestablishment of a network connection to the ingestion engine, the ingestion client application may communicate a notification to one or more server computers that may be hosting the ingestion engine, such as, cost modeling platform server computer 107. In some embodiments, the notification may indicate that the ingestion client application is now available and ready to perform interactive error corrections and/or display one or more reports regarding the ingestion operations. Upon receiving notification that a client application is active, the ingestion engine may be arranged to respond with updated ingestion report information and/or initiate an interactive error correction session to execute on the client application.

At block 1012, in at least one of the various embodiments, the source and type of errors that triggered the interactive corrective session may be tracked and/or stored. In at least one of the various embodiments, tracking may include the origin of the raw data sets that cause errors. This may enable a user to focus corrective efforts on data sets from a particular source. Likewise, the tracking of errors may help identify how errors may be getting into the raw data sets. For example, a database containing information used in the raw data sets may be configured incorrectly, or it may contain bad data. In at least one of the various embodiments, reports may be generated from the stored errors information and/or error correction information that may be employed for identifying and/or isolating one or more error sources. Next, control may be returned to a calling process.

Figure 11:
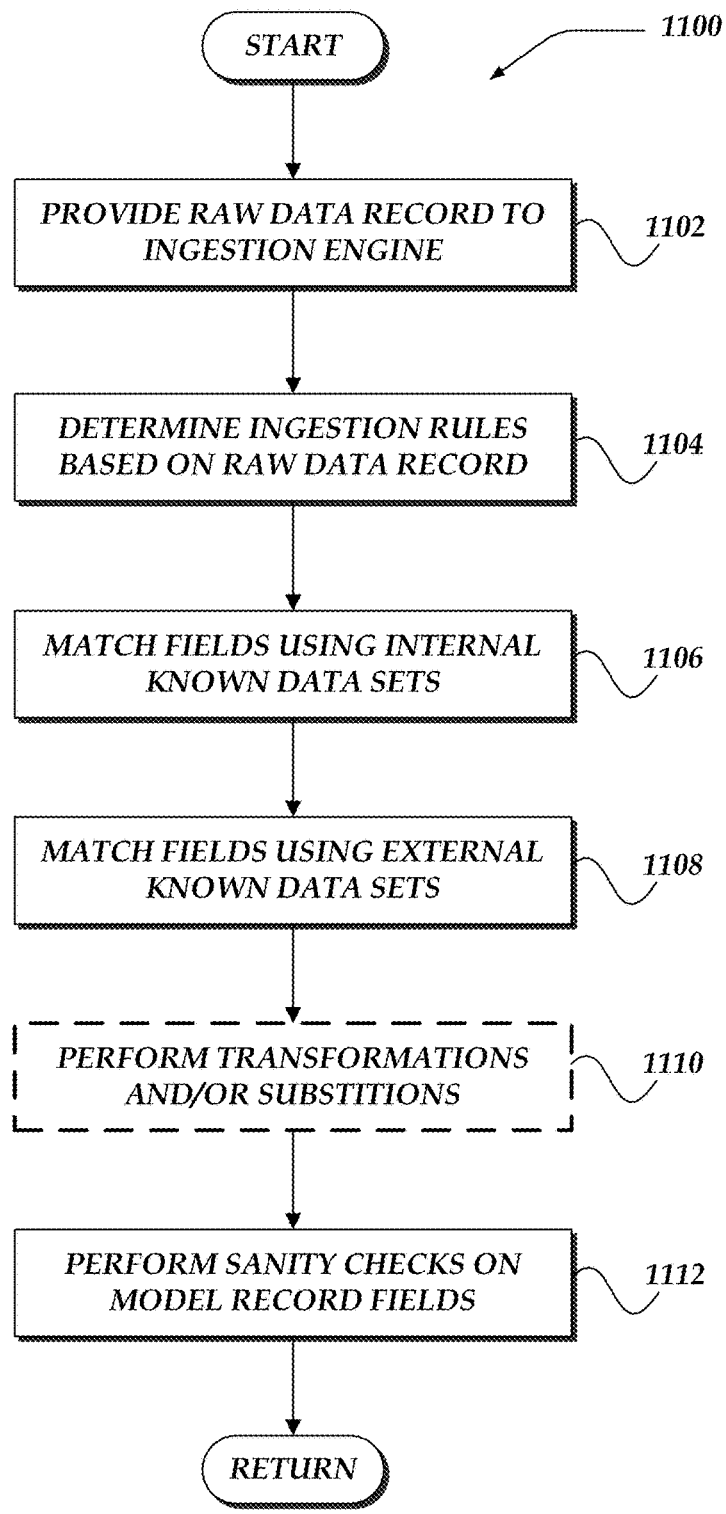
FIG. 11 illustrates a flowchart for a process for generating a normalized model record in accordance with at least one of the various embodiments.

FIG. 11 illustrates a flowchart for process 1100 for generating a normalized model record in accordance with at least one of the various embodiments. After a start block, at block 1102, in at least one of the various embodiments, one or more raw data records may be provided to the ingestion engine. In some embodiments, more than one raw data records may be provided to enable ingestion rules that employ look back and/or look ahead techniques. For example, an ingestion rule may be arranged to employ one or more previously provided raw data records to process a current raw data record. Likewise, in some cases, an ingestion rule may be arranged to employ one or more later provided raw data records to process a current raw data record.

Also, in at least one of the various embodiments, some ingestion rules may be arranged to employ previously generated model records during the processing of a provided raw data record.

At block 1104, in at least one of the various embodiments, one or more ingestion rules may be determined. In some embodiments, all available ingestion rules may be determined. In other embodiments, one or more ingestion rules may be associated with particular data sources, data types, customers, users, or the like. In some embodiments, customer ingestion rules may be associated with a one or more particular organizations.

At block 1106, in at least one of the various embodiments, the ingestion rules may be applied to match one or more fields in the raw data record to values in one or more internal data sets. In at least one of the various embodiments, specific ingestion rules may be arranged to employ internal data sets to perform fuzzy matches to identify/confirm values that should be included in a model record. In some cases, general ingestion rules may be arranged to confirm values for telephone numbers, email addresses, hostnames, room numbers, building numbers, physical addresses, employee names, or the like. Accordingly, for example, if a specific rule identifies a field as containing an employee name, the general employee name matching rule may be executed to confirm that the name is the current employee name database.

In at least one of the various embodiments, rules may be arranged to use various techniques for matching raw data values with model values, such as, regular expressions, procedural steps, machine learning classifiers, or the like, or combination thereof. In some embodiments, rules may be arranged into a hierarchy that enables cheaper/faster matching techniques to be performed before slower/expensive techniques. Accordingly, if the raw data set is in good condition the fastest/cheapest matching techniques may be used. In contrast, if the raw data set includes errors and/or inconsistencies more expensive matching techniques may be applied.

In at least one of the various embodiments, internal known data set values may be cached locally by the ingestion engine to avoid the expense of retrieved the data from another internal system. Also, in at least one of the various embodiments, some data sets may be recognized as having a history of being correct. Accordingly, the ingestion engine may be arranged to reduce the amount of match checking and/or value confirmation for data sets that have an error rate that is determined to be below a defined threshold value. In some embodiments, the error rate threshold may be associated with particular columns/fields of the raw/model records. Accordingly, in at least one of the various embodiments, fields that are more critical to the integrity of the model may be configured to be checked more often (or have lower error thresholds) than fields that are not critical to the integrity of the model.

At block 1108, in at least one of the various embodiments, the ingestion rules may be applied to match one or more fields in the raw data record to values in one or more internal data sets. Similar, to matching data values using internal known data set, external data sets provided by third parties may be used as well. In some cases, the third party may provide a remotely accessible API and/or service that may be used as part of the process to discover matches for raw data values.

In at least one of the various embodiments, the external service may confirm the correctness of a provided value. In other cases, the external service may provide a result set based on the provided value. Accordingly, the result set may be employed to match the raw data value a value for use in the model record.

At block 1110, in at least one of the various embodiments, optionally, if there are transformations and/or substitution to be made based on the application of one or more of the ingestion rules they may be performed. This block may be considered optional because in some cases, the raw data records may be accepted without requiring transformations and/or substitutions.

At block 1112, in at least one of the various embodiments, the ingestion engine may apply one or more ingestion rules that may be arranged to confirm the correctness of candidate model records before they are added to the model. In some embodiments, such as, may include testing for required fields, sanity checking for values, or the like. In at least one of the various embodiments, sanity checking may include confirming that resource values are within a normal range. For example, if a server computer model record shows a cost value of $10 a sanity checking rule that defined an expected range of cost as $800-$4000 may be employed to identify the potentially incorrect entry. In at least one of the various embodiments, one or more sanity check errors may be processed interactively (as described above) to enable users to correct the data and/or update the rules to accommodate the data values that may appear to be incorrect. Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for ingesting data for a data model using a network computer that employs one or more processors to execute instructions that perform actions, comprising:
   providing one or more raw data sets to an ingestion engine, wherein each raw data set includes one or more raw records;
   providing one or more ingestion rules associated with one or more confidence scores and one or more known data sets based on a type of the one or more raw records;
   employing the ingestion engine to iteratively execute the one or more ingestion rules, performing further actions, including:
      providing a comparison of one or more portions of the one or more raw records to the one or more known data sets;
      transforming contents of the one or more raw records into one or more model record values based on the comparison to the one or more known data sets;
      storing the one or more model record values in one or more model records;
      providing a score value that indicates a confidence level that the one or more model records are correct based on the one or more confidence scores; and
      storing an association of the one or more ingestion rules used to transform the raw record contents into the model record values stored in the one or more model records; and
   when the score value that indicates the confidence level of the one or more model records is less than a threshold value, performing further actions, including:
      providing a user-interface to interactively edit the one or more raw records or the one or more ingestion rules, wherein the edited one or more ingestion rules produce an increase change or a decrease change in the one or more confidence scores, wherein the one or more changed confidence scores are employed to provide the score value; and
   storing the one or more model records in a data store, wherein the one or more model records are added to the data model.

2. The method of claim 1, further comprising, providing one or more suggested model record values for the one or more model records based on the one or more raw records and the one or more known data sets.

3. The method of claim 1, wherein the one or more known data sets are provided from one or more external sources.

4. The method of claim 1, wherein providing the comparison of the one or more portions of the one or more raw records to the one or more known data sets further comprises, communicating the one or more portions of the one or more raw records to an external service to perform the comparison.

5. The method of claim 1, further comprising:
   when two or more of the one or more ingestion rules matches a raw record, performing further actions:
      providing at least one model record for each of the matched two or more ingestion rules; and
      allocating one or more resource values corresponding to the raw record to the at least one model records based on weighting values that are associated with the two or more ingestion rules.

6. The method of claim 1, wherein providing the user-interface that enables interactive modification of the one or more model records further comprises:
   storing a historical record of the modifications made to the one or more model records; and
   generating a report that includes a source and a type of one or more errors that triggered the interactive modification session.

7. The method of claim 1, wherein providing the one or more raw data sets to an ingestion engine, comprises further actions, including:
   caching at least a portion of the one or more raw data sets when network communication is disabled; and
   providing the cached at least portion of the one or more raw data sets when network communication is enabled.

8. A system for ingesting data for a data model, comprising:
   a network computer, comprising:
      a transceiver that communicates over the network;
      a memory that stores at least instructions; and
      a processor device that executes instructions that perform actions, including:
         providing one or more raw data sets to an ingestion engine, wherein each raw data set includes one or more raw records;
         providing one or more ingestion rules associated with one or more confidence scores and one or more known data sets based on a type of the one or more raw records;
         employing the ingestion engine to iteratively execute the one or more ingestion rules, performing further actions, including:
            providing a comparison of one or more portions of the one or more raw records to the one or more known data sets;
            transforming contents of the one or more raw records into one or more model record values based on the comparison to the one or more known data sets;
            storing the one or more model record values in one or more model records;
            providing a score value that indicates a confidence level that the one or more model records are correct based on the one or more confidence scores; and
            storing an association of the one or more ingestion rules used to transform the raw record contents into the model record values stored in the one or more model records;
         when the score value that indicates the confidence level of the one or more model records is less than a threshold value, performing further actions, including:
            providing a user-interface to interactively edit the one or more raw records or the one or more ingestion rules, wherein the edited one or more ingestion rules produce an increase change or a decrease change in the one or more confidence scores, wherein the one or more changed confidence scores are employed to provide the score value; and
         storing the one or more model records in a data store, wherein the one or more model records are added to the data model; and a client computer, comprising:
  a transceiver that communicates over the network;
  a memory that stores at least instructions; and
  a processor device that executes instructions that perform actions, including:
    providing the user-interface to a user; and
    providing one or more user interactions to the ingestion engine.

9. The system of claim 8, further comprising, providing one or more suggested model record values for the one or more model records based on the one or more raw records and the one or more known data sets.

10. The system of claim 8, wherein the one or more known data sets are provided from one or more external sources.

11. The system of claim 8, wherein providing the comparison of the one or more portions of the one or more raw records to the one or more known data sets further comprises, communicating the one or more portions of the one or more raw records to an external service to perform the comparison.

12. The system of claim 8, wherein the network computer processor device executes instructions that perform actions, further comprising:
  when two or more of the one or more ingestion rules matches a raw record, performing further actions:
    providing at least one model record for each of the matched two or more ingestion rules; and
    allocating one or more resource values corresponding to the raw record to the at least one model records based on weighting values that are associated with the two or more ingestion rules.

13. The system of claim 8, wherein providing the user-interface that enables interactive modification of the one or more model records further comprises:
  storing a historical record of the modifications made to the one or more model records; and
  generating a report that includes a source and a type of one or more errors that triggered the interactive modification session.

14. The system of claim 8, wherein providing the one or more raw data sets to an ingestion engine, comprises further actions, including:
  caching at least a portion of the one or more raw data sets when network communication is disabled; and
  providing the cached at least portion of the one or more raw data sets when network communication is enabled.

15. A processor readable non-transitory storage media that includes instructions for ingesting data for a data model, wherein execution of the instructions by a hardware processor performs actions, comprising:
  providing one or more raw data sets to an ingestion engine, wherein each raw data set includes one or more raw records;
  providing one or more ingestion rules associated with one or more confidence scores and one or more known data sets based on a type of the one or more raw records;
  employing the ingestion engine to iteratively execute the one or more ingestion rules, performing further actions, including:
    providing a comparison of one or more portions of the one or more raw records to the one or more known data sets;
    transforming contents of the one or more raw records into one or more model record values based on the comparison to the one or more known data sets;
    storing the one or more model record values in one or more model records;
    providing a score value that indicates a confidence level that the one or more model records are correct based on the one or more confidence scores; and
    storing an association of the one or more ingestion rules used to transform the raw record contents into the model record values stored in the one or more model records;
  when the score value that indicates the confidence level of the one or more model records is less than a threshold value, performing further actions, including:
    providing a user-interface to interactively edit the one or more raw records or the one or more ingestion rules, wherein the edited one or more ingestion rules produce an increase change or a decrease change in the one or more confidence scores, wherein the one or more changed confidence scores are employed to provide the score value; and
  storing the one or more model records in a data store, wherein the one or more model records are added to the data model.

16. The media of claim 15, further comprising, providing one or more suggested model record values for the one or more model records based on the one or more raw records and the one or more known data sets.

17. The media of claim 15, wherein the one or more known data sets are provided from one or more external sources.

18. The media of claim 15, wherein providing the comparison of the one or more portions of the one or more raw records to the one or more known data sets further comprises, communicating the one or more portions of the one or more raw records to an external service to perform the comparison.

19. The media of claim 15, further comprising:
  when two or more of the one or more ingestion rules matches a raw record, performing further actions:
    providing at least one model record for each of the matched two or more ingestion rules; and
    allocating one or more resource values corresponding to the raw record to the at least one model records based on weighting values that are associated with the two or more ingestion rules.

20. The media of claim 15, wherein providing the user-interface that enables interactive modification of the one or more model records further comprises:
  storing a historical record of the modifications made to the one or more model records; and
  generating a report that includes a source and a type of one or more errors that triggered the interactive modification session.

21. The media of claim 15, wherein providing the one or more raw data sets to an ingestion engine, comprises further actions, including:
  caching at least a portion of the one or more raw data sets when network communication is disabled; and
  providing the cached at least portion of the one or more raw data sets when network communication is enabled.

22. A network computer for ingesting data for a data model, comprising:
  a transceiver that communicates over the network;
  a memory that stores at least instructions; and
  a processor device that executes instructions that perform actions, including:

providing one or more raw data sets to an ingestion engine, wherein each raw data set includes one or more raw records;

providing one or more ingestion rules associated with one or more confidence scores and one or more known data sets based on a type of the one or more raw records;

employing the ingestion engine to iteratively execute the one or more ingestion rules, performing further actions, including:

providing a comparison of one or more portions of the one or more raw records to the one or more known data sets;

transforming contents of the one or more raw records into one or more model record values based on the comparison to the one or more known data sets;

storing the one or more model record values in one or more model records;

providing a score value that indicates a confidence level that the one or more model records are correct based at least on the one or more confidence scores;

storing an association of the one or more ingestion rules used to transform the raw record contents into the model record values stored in the one or more model records;

when the score value that indicates the confidence level of the one or more model records is less than a threshold value, performing further actions, including:

providing a user-interface to interactively edit the one or more raw records or the one or more ingestion rules, wherein the edited one or more ingestion rules produce an increase change or a decrease change in the one or more confidence scores, wherein the one or more changed confidence scores are employed to provide the score value; and storing the one or more model records in a data store, wherein the one or more model records are added to the data model.

23. The network computer of claim 22, further comprising, providing one or more suggested model record values for the one or more model records based on the one or more raw records and the one or more known data sets.

24. The network computer of claim 22, wherein the one or more known data sets are provided from one or more external sources.

25. The network computer of claim 22, wherein providing the comparison of the one or more portions of the one or more raw records to the one or more known data sets further comprises, communicating the one or more portions of the one or more raw records to an external service to perform the comparison.

26. The network computer of claim 22, further comprising:

when two or more of the one or more ingestion rules matches a raw record, performing further actions:

providing at least one model record for each of the matched two or more ingestion rules; and allocating one or more resource values corresponding to the raw record to the at least one model records based on weighting values that are associated with the two or more ingestion rules.

27. The network computer of claim 22, wherein providing the user-interface that enables interactive modification of the one or more model records further comprises:

storing a historical record of the modifications made to the one or more model records; and generating a report that includes a source and a type of one or more errors that triggered the interactive modification session.

28. The network computer of claim 22, wherein providing the one or more raw data sets to an ingestion engine, comprises further actions, including:

caching at least a portion of the one or more raw data sets when network communication is disabled; and providing the cached at least portion of the one or more raw data sets when network communication is enabled.

\* \* \* \* \*

UNITED STATES PATENT AND TRADEMARK OFFICE
CERTIFICATE OF CORRECTION

PATENT NO.        : 9,529,863 B1
APPLICATION NO.   : 14/977368
DATED             : December 27, 2016
INVENTOR(S)       : Gindin et al.

Page 1 of 2

It is certified that error appears in the above-identified patent and that said Letters Patent is hereby corrected as shown below:

On Page 2, in Item (56), under "U.S. PATENT DOCUMENTS", in Column 2, Line 27, delete "Sievers-Tostes" and insert -- Sievers-Tostes et al. --, therefor.

On Page 2, in Item (56), under "U.S. PATENT DOCUMENTS", in Column 2, Line 30, delete "Brooks" and insert -- Brooks et al. --, therefor.

On Page 3, in Item (56), under "U.S. PATENT DOCUMENTS", in Column 1, Line 10, delete "Miller" and insert -- Miller et al. --, therefor.

On Page 3, in Item (56), under "U.S. PATENT DOCUMENTS", in Column 1, Line 40, delete "Chachra" and insert -- Chachra et al. --, therefor.

On Page 3, in Item (56), under "OTHER PUBLICATION", in Column 1, Line 14, delete "8 Pages." and insert -- 4 Pages. --, therefor.

In Column 2, Line 21, delete "DESCRIPTION" and insert -- DETAILED DESCRIPTION --, therefor.

In Column 5, Line 34, delete "Cost Modeling Platform Server (CMP)" and insert -- Cost Modeling Platform (CMP) --, therefor.

In Column 5, Line 46, delete "Personal Digital Assistants (PDA's)," and insert -- Personal Digital Assistants (PDAs), --, therefor.

In Column 6, Lines 26-27, delete "wireless application protocol messages (WAP)," and insert -- wireless application protocol (WAP) messages, --, therefor.

In Column 7, Line 10, delete "Mobil" and insert -- Mobile --, therefor.

In Column 7, Lines 11-12, delete "Enhanced Data GSM Environment (EDGE)," and insert -- Enhanced Data rate for GSM Evolution (EDGE), --, therefor.

Signed and Sealed this
Tenth Day of April, 2018

Andrei Iancu
*Director of the United States Patent and Trademark Office*

CERTIFICATE OF CORRECTION (continued)
U.S. Pat. No. 9,529,863 B1

In Column 8, Line 29, delete "CMP Server Computer 107" and insert -- CMP 107 --, therefor.

In Column 8, Lines 46-47, delete "(GPS) receiver 258," and insert -- (GPS) transceiver 258, --, therefor.

In Column 8, Lines 47-48, delete "temperature interface 262," and insert -- sensors 262, --, therefor.

In Column 8, Line 67, delete "OSI model for mobile communication (GSM)," and insert -- global system for mobile communication (GSM), --, therefor.

In Column 9, Line 7, delete "(MC)." and insert -- (NIC). --, therefor.

In Column 10, Line 27, delete "200" and insert -- 200. --, therefor.

In Column 11, Line 4, delete "wireless application protocol messages (WAP)," and insert -- wireless application protocol (WAP) messages, --, therefor.

In Column 12, Line 26, delete "(GPS) receiver 362," and insert -- (GPS) transceiver 362, --, therefor.

In Column 13, Line 2, delete "USB™" and insert -- USB™, --, therefor.

In Column 14, Lines 5-6, delete "Data storage 410" and insert -- Data storage 310 --, therefor.

In Column 14, Lines 34-35, delete "benmarking application 324," and insert -- ingestion engine 324, --, therefor.

In Column 14, Lines 52, delete "GPS 362." and insert -- GPS Transceiver 362. --, therefor.

In Column 14, Line 64, delete "based computing" and insert -- computing --, therefor.

In Column 16, Line 27, delete "applications object 406." and insert -- applications object 408. --, therefor.

In Column 18, Line 29, delete "illustrates" and insert -- illustrates a --, therefor.

In Column 21, Line 49, delete "barny." and insert -- barney. --, therefor.

In Column 27, Line 21, delete "Fig. 6" and insert -- Fig. 6, --, therefor.